(12) United States Patent
Steinhardt

(10) Patent No.: US 8,029,666 B2
(45) Date of Patent: *Oct. 4, 2011

(54) WASTEWATER SCREENING DEVICE

(76) Inventor: Jörg-Michael Steinhardt, Taunusstein (DE)

( * ) Notice: Subject to any disclaimer, the term of this patent is extended or adjusted under 35 U.S.C. 154(b) by 78 days.

This patent is subject to a terminal disclaimer.

(21) Appl. No.: 12/384,811

(22) Filed: Apr. 9, 2009

(65) Prior Publication Data

US 2009/0314705 A1    Dec. 24, 2009

(30) Foreign Application Priority Data

May 5, 2008    (DE) .......................... 10 2008 022 167
Nov. 21, 2008  (EP) ...................................... 08075896

(51) Int. Cl.
*E03F 5/14*    (2006.01)
(52) U.S. Cl. ......... 210/156; 210/159; 210/162; 210/413
(58) Field of Classification Search .................. 210/156, 210/159, 162, 170.03, 413, 415, 499
See application file for complete search history.

(56) References Cited

U.S. PATENT DOCUMENTS

| | | | | |
|---|---|---|---|---|
| 2,198,943 A | * | 4/1940 | Lowe | 210/162 |
| 4,642,195 A | * | 2/1987 | Nill | 210/159 |
| 5,715,668 A | * | 2/1998 | Filion et al. | 210/159 |
| 6,126,821 A | | 10/2000 | Corcoran | |
| 7,094,337 B2 | * | 8/2006 | Williams et al. | 210/162 |
| 2009/0272685 A1 | * | 11/2009 | Steinhardt | 210/499 |
| 2010/0108582 A1 | * | 5/2010 | Steinhardt | 210/107 |
| 2010/0200483 A1 | * | 8/2010 | Giehl | 210/170.03 |

FOREIGN PATENT DOCUMENTS

| | | |
|---|---|---|
| DE | 4215002 A1 | 12/1992 |
| DE | 19515924 A1 | 10/1995 |
| DE | 19617665   * | 11/1997 |
| EP | 488983   * | 6/1992 |
| EP | 1223252 A2 | 7/2002 |
| GB | 2310382 A | 8/1997 |
| WO | WO 94/07585 A1 | 4/1994 |
| WO | WO 95/19471 A1 | 7/1995 |
| WO | WO 98/31882 A1 | 7/1998 |
| WO | WO 99/49145 A1 | 9/1999 |
| WO | WO 01/75240 A1 | 10/2001 |

OTHER PUBLICATIONS

Thompson/Jones/Basford, ThompsonRPM CSO Post Project Appraisal, Dec. 2004, Version 1.0, Wales, 413 pages.

* cited by examiner

*Primary Examiner* — Christopher Upton
(74) *Attorney, Agent, or Firm* — Price Heneveld LLP

(57) ABSTRACT

A wastewater screening device includes a perforate screening member through which wastewater flows, including a plurality of laterally spaced apart screening rods interconnected by cross members, such that solids in the wastewater are captured by the screening member. A plurality of wiping elements are positioned between the screening rods and shift longitudinally to clear screenings from the screening member. Each of the wiping elements has at least one end projection disposed laterally between opposite sides of the screening member, and a tapered wiping surface.

29 Claims, 20 Drawing Sheets

WASTEWATER SCREENING DEVICE

CLAIM OF PRIORITY

Applicant hereby claims the priority benefits under the provisions of 35 U.S.C. §119, basing said claim of priority on German Patent Application Serial No. 10 2008 022167.8 filed May 5, 2008 and related European Patent Application Serial No. 08075896.4, filed Nov. 21, 2008. In accordance with the provisions of 35 U.S.C. §119 and Rule 55(b), a certified copy of the above-listed German patent application will be filed before grant of a patent.

BACKGROUND OF THE INVENTION

The invention relates to a screening device for retaining, at overflow weirs, solids which are carried along in wastewater, and clearing screenings therefrom. The screening device has a flow passing through it, with a wastewater side and a clean water side. The screening device also has a multiplicity of screening rods, which are arranged parallel to one another, and are mounted on cross members. The apparatus for clearing away the screenings has wiping elements for the screenings, which can be moved in the longitudinal direction of the screening rods, and are respectively arranged between adjacent screening rods, wherein the wiping elements have tapering projections at least in the direction of movement.

In such a screening device, that side of the screening device which faces the wastewater is referred to as the wastewater side, while the other side of the screening device, through which essentially only liquid from which the screenings are cleared away passes, is referred to as the clean water side.

In the treatment of rainwater and wastewater there are a wide variety of screening devices which were created by Thompson RPM in December 2004 as part of a research study for Walsh Water. The study tested the practical effectiveness during use of the most common screening devices, including those of cleared and uncleared designs, and those which are embodied as screens, as sieves or as honeycomb meshes.

The present invention relates to cleared screening devices with rods on the overflows.

Rod screens are available in a wide variety of embodiments, wherein devices which have stressed screening rods are one example. These devices typically do not have any cross struts for support. The distance between the screening rods is configured in accordance with the wiping elements. The pre-stressed rods have a rod distance of mainly 4 and 6 mm. Wiping elements are arranged between the rods in such a way that, when they move in one direction, they easily lift up the screenings, and move through under them. During the reverse travel, the screenings are transported to one side by steep parts of the wiping elements. The screenings have to be picked up repeatedly, and therefore may be comminuted or broken apart. Compacting the screenings also results, particularly at the ends of the screening rods, where the screenings are pressed against the frame carriers, such that the screenings must be pressed out neatly from the clean water side (facing away from the wastewater) to the wastewater side, which is opposite or counter to the water flow and/or pressure through the screening device. Fiberization and compacting therefore occurs, which lead to operating problems. The pre-stressed rods are not entirely rigid (i.e., they can bend apart laterally owing to the water pressure and the prevailing speed, owing to the water turbulence, or else owing to the water pressure), so that they can oscillate or deflect, such that there is a risk that together with water constituents, small stones will also get lodged between the rods, causing tilting to occur when the wiping elements move through the rods, and attempt to realign the same. If the stones do not become loose, because they have already wedged themselves too far in owing to the water pressure and the screening rods which are bending apart, this causes the system to fail.

Other types of screening rods are rigidly mounted, and may be rigidly welded to a frame at the end of the screening head, before the head. In such devices, the screenings are compacted, in particular at the ends of the screening rods where they are welded to the frame carriers, such that the screenings must be pressed out obliquely from the clean water side (facing away from the water) to the wastewater side in a direction opposite or counter to the water flow and/or pressure through the screening device. Fiberization and compacting occur, which lead to operating problems. Other screening devices, for example those with straight, flat steel, are welded approximately every 60 cm, with the ends being angled or bent to the side or rear, beyond the back parts of the flat rods. As a result of the ends of screening rods, which are angled to the side or rear, the wiping elements, which are seated on the clean water side of the device, press through the screening rods, which extend upwards at the sides, and force the water constituents, the screenings, etc. back into the wastewater medium. However, the capital expenditure, statics, performance and operating costs are disadvantageous. Furthermore, when heavy rain occurs, the screen floods from rainwater entering through the upper or clean water side of the screen, in which case water constituents or debris become deposited on the rear or clean water side of the screen and cause blockage. The same type of blockage also occurs if stones or other items pass from the entry area onto the upper surfaces of the screening rods.

Furthermore, in devices having screening rods arranged lying flat, but which extend upwardly at the welding point, dirt collection spaces are created whose dimensions are significantly too small for large overflow quantities with a large dirt load and a large amount of screenings. Relatively large dimensioned spaces are not possible, since the screenings will flow through the same.

A screening device of the type mentioned above, which is embodied as a flat screen, is described in DE 195 15 924 A1.

Another screening device, which is embodied as a flat screen, is known from DE 42 15 002 A1. In this flat screen, the individual rods are arranged horizontally, with the respective rods being formed from flat pieces of metal which protrude upwardly, and a round rod which is attached to the underside of the flat pieces of metal.

WO 99/49145 likewise discloses a flat screen with straight screening rods. A device for clearing away the screenings has wiping elements, which are introduced between the screening rods. Each wiping element has projections in both directions of movement, which projections taper toward the free ends. In the two end positions of the device for clearing away the screenings, the projections engage behind cross members of the frame in the region of deposition surfaces of the cross members and make contact with them, with the result that screenings which have come onto the clean side of the wiping element are removed by means of blade edges on the deposition surfaces.

WO 98/31882 describes a screening device in which the respective screening rods have a straight long section and fittings, which are arranged at an oblique angle with respect to the latter, are directed away from the wastewater side to the clean water side, and whose free ends are connected to carriers of the frame. A device for clearing away the screenings is likewise provided, comprising wiping elements between the sections arranged in the respective end regions of the rods, and deposits screenings on the assigned carrier plate.

WO 01/75240 A1 describes a screening device of the type described above in which the screening rods are curved toward the wastewater side, along an arc. The center points of the circles on the wastewater side and on the clean water side of the rod are concentric or the same. Above the screening rods is a device for clearing away the screenings, which can be moved horizontally. The screening device has wiping elements, and in a position at approximately half the length of the respective screening rods, each wiping element projects straight as far as the wastewater side boundary of the screening rod, and as the movement of the respective wiping element increases in the direction of the respective end region of the screening rod, the latter increasingly emerges on the wastewater side of the screening rod arrangement. In the end position, the wiping element engages, with a section arranged parallel to its direction of movement, behind a carrier plate for supporting the screening rod in the region of the screening rod end, and it conveys away screenings which are located on the wastewater side of the carrier plate.

The screening devices discussed with respect to the prior art have the disadvantages discussed in detail above.

SUMMARY OF THE INVENTION

One object of the present invention is to provide a screening device of the type described above, configured in such a way that the screenings can be cleared away without compacting them.

The object is achieved by providing wipers with at least one tapering end projection, which tapers on its wastewater side and its clean water side in the direction of movement of the end projection, and is arranged along the adjacent screening rods.

This way of configuring the respective wiping element in the region of its end projection, which extends forward in the direction of movement of the wiping element, ensures that when the wiping element moves, because of its tapering configuration, the end projection on the wastewater side moves any screenings disposed between the adjacent screening rods. The movement component applied by the end projection is perpendicular to the direction of movement of the wiping element, and therefore moves said screenings out of and away from the intermediate space between the adjacent screening rods. The same movement of screenings occurs on the clean water side, because the region of the end projection which faces the clean water side acts, because of its tapering, in a corresponding way on screenings located there. Since the end projection is arranged along and between the adjacent screening rods, it is always ensured that, as the wiping element moves, screenings which are located between adjacent screening rods come into contact with the contour of one of the tapering projections, and are thereby transported with a movement component to either the wastewater side of the screening device, or the clean water side of the screening device. The screenings are therefore not compacted during the clearing process.

This clearing effect can be improved further if, during a movement of the wiping element, the contour of the end projection which faces the wastewater side and/or the clean water side is different than the contour of the screening rods facing the wastewater side and/or the clean water side, so that part of the end projection emerges or protrudes on the wastewater side and/or clean water side, from the gap between adjacent screening rods. In particular, as the end projection moves in its direction of movement, it is moved with a movement component in the direction of the wastewater side of the adjacent screening rods.

The screening device is configured in such a way that wastewater flow passes through it from the bottom to the top, with a lower wastewater side and an upper clean water side. With this direction of through flow, the solids which are carried along in the wastewater are pressed against the screening rods with lower pressure than when the screening device has a flow through it from the top to the bottom.

The wiping elements, which are arranged between the screening rods, can be moved to and fro, wherein each wiping element has tapering projections on opposite sides thereof. However, it is also conceivable that the wiping elements may be arranged so that they do not move to and fro, but rather the screening device and the wiping elements are arranged and operated in a rotating fashion. However, the flat arrangement is preferred in certain situations, so as to have microelements, which can move to and fro, so that there is the possibility of locating calm zones at distances which are not too large, and therefore storing cleared screenings at the reversal points of the wiping elements. Accordingly, an effort is preferably made to permit bidirectional mobility of the wiping elements.

In view of this aspect of the invention, it is considered particularly advantageous if the end projections engage one behind the other at the end positions of the wiping element, behind the cross members in the region of deposition surfaces of the cross members, whereby the deposition surfaces face the wastewater side of the device. In particular, at the end positions of the wiping element, a gap is formed between the projections and the deposition surfaces, which widens in the direction of the free end of the respective end projection.

The gaps at the end positions of the wiping elements between the projections and the deposition surfaces of the cross members ensure that the screenings are not compacted in the region of the respective cross member after they are discharged from the gaps formed between two adjacent screening rods. Rather, owing to the configuration of the gap, which widens in the direction of movement of the wiping element, sufficient gap space is provided to feed the screenings to the side. Since the screenings in the region of the respective cross member are not compacted, the screenings can fall or drop in this region of calmed flow, that is to say, the calm zone, adjacent to the cross member, and then be conveyed away with the wastewater.

The calm zone in the wastewater is not a dirt collection space, but rather a detachment zone. In prior art screening devices, the wastewater normally presses the contaminants against the rods.

Starting from a certain thickness of debris or dirt, the clearing away device pushes the screenings bidirectionally to both opposite sides, and to the calm/detachment zones in the regions of the cross members. Since there is no significant water pressure or vertical flow there, relatively large deposits of screenings can drop downwardly under gravitational forces, and be transported away to the wastewater treatment plant from the water running thereover.

The screenings can therefore be wiped off in a gentle fashion over a relatively short distance. The calm zones, which are formed by flat, broad cross members, reduce or take up the water pressure, and feed into and rigidify the grill frame structure which holds the screening rods, which preferably is of a modular design.

The cross members or cross struts are preferably flat plates, for example at a fixed distance, such as approximately 65 cm, and are positioned in such a way that calm zones on the wastewater side and clean water side are produced between adjacent modules of the screening rods.

At its end position, each wiping element is preferably in contact with the adjacent cross member along a line, or in line contact. Accordingly, the gap in the region of its end, which extends in the direction of movement of the wiping element, is closed. As a result, when each wiping element moves into its end position, it is not possible for screenings to pass through the gap. Depending on the screenings in question, it may, however, actually be advantageous to leave a certain gap in the region between the wiping element and the cross member, instead of the aforesaid line contact. In this case, water can pass through the tapering gap, and if appropriate, a small proportion of screenings can also pass through, as the wiping element is shifted or transferred toward its end position.

The respective wiping element is preferably of a plate-shaped design, and is slightly less thick than the width or thickness of the gap between adjacent screening rods.

In one preferred configuration of the present invention, the end projections on the respective wiping elements are curved, and in particular, are curved inward (downstream) or outward (upstream). This configuration of the projections pertains to both the wastewater side and to the clean water side of the respective wiping element. According to one alternative configuration, the end projections of the respective wiping elements are configured in such a way that their ends are in the shape of a cone in the direction of the free end of the respective end projection.

The wiping element preferably has on the wastewater side thereof an elevated section adjoining the end projections or between the end projections of this wiping element. The wastewater side contour of the section is continuously curved or extends approximately parallel to the direction of travel of the wiping element.

In the embodiment of the present invention, the wiping element is preferably shaped in such a way that:
 a) the through flow of water between the screening rods is calmed in this region (for example by means of rounded wiping elements),
 b) owing to the shape, in particular a curved shape of the wiping element, the wiping element causes the constituents or debris in the water which penetrates between the screening rods to be automatically removed, and
 c) the upper part of the wiping elements lifts out debris or residue lying on the upper or clean water sides of the screening rods from the gaps between the steel elements and deposits the same on the cross members.

The wiping element therefore acts in the manner of a flow divider.

When the screening device is operating, the effectiveness of the clearing process can be optimized by virtue of the fact that the position of the wiping elements can be adjusted in the direction of the wastewater side and/or the clean water side of the screening device. This ensures that each wiping element, and therefore its projection or projections, can be positioned in an optimum way in the intermediate space between adjacent screening rods, so that the relative positioning of the wiping elements with respect to the screening rods can be used to directly influence the discharge geometry of the wiping element and the screening rods which interact with it.

Instead of or in addition to the wiping elements, brushes can be arranged in front of the wiping element on both sides thereof to assist in performing the clearing function.

Reducing the flow pressure is particularly significant for gentle transportation of the screenings, and above all, has the effect of increasing the water quality, since the screenings are not broken up or comminuted. Alternatively, a metal plate can be arranged on the respective wiping element on the rear of the side facing away from the wastewater in such a way that when the side facing away from the wastewater moves, a water counter-pressure is reduced, and the pressure applied to the screenings is significantly reduced.

The screening rods of the screening device are preferably configured in such a way that the screening rods, in particular all the screening rods, become vertically narrower or flatter toward their ends.

The screening rods are preferably shaped in such a way that they absorb large forces with little material, and at the same time, have approximately the same flow resistance everywhere through flow occurs across the screening device. A force-absorbing lattice is formed in the screening rod, with the effect that the respective screening rod becomes flatter toward its ends. The water particles travel along oblique paths through the rod screening elements to the calm zones located in the region of the rod ends. Consequently, these paths will become longer if the rod ends do not become vertically narrower or flatter. Owing to the configuration of the screening rods, which become flatter toward their ends, the resistance of the screening element remains virtually the same everywhere, particularly when installed in a horizontal or lying position.

It is particularly advantageous if the screening device is of an absolutely flat design, and without additional structural measures, even in the case of low structures, and without overfall edges or shaft covers having to be broken off. The frame can, in particular, be shortened to form a hydraulic drive.

The screening device is preferably configured with either flat screening elements, or curved screening elements. The configuration with curved screening elements is particularly advantageous in some applications.

Depending on the desired performance characteristics, the screening rods can be arranged curved in such a way that the screenings are lowered into relatively deep layers, and can be transported away more easily and with less flow pressure, corresponding to the water flowing to the wastewater treatment plant.

In the case of a curved screening element, the screening rods are preferably shaped in such a way that each screening rod has a smaller curved radius on the wastewater side than the radius of the screening rod on the clean water side.

Irrespective of whether the screening device is embodied as a flat screening device, or curved screening device, the screening rods preferably have an identical lateral thickness in the direction perpendicular to the flow of clean water through the screening device. The screening rods are arranged with their ends positioned in the direction of the clean water through flow. They preferably have a rectangular cross-sectional shape.

The direction of movement of the wiping elements and therefore of the end projection or end projections results from the specifications of the geometric arrangement of the screening rods. In the case of a curved screening element, the direction of movement of the wiping elements or of the end projection or ends projections is preferably along a circular arc, while in the case of a flat screening element, the direction of movement of the wiping element or of the end projection or end projections is preferably linear.

In one embodiment of the present invention, the screening device is a fine screening element with a distance between adjacent rods of around 4 to 6 mm. Larger spacings between the rods are also possible.

According to one preferred embodiment of the present invention, the screening device, whether it is a flat screening element or a curved screening element, incorporates screening rods which have fittings (male elements) of several millimeters in height and width at their ends, which can be plugged easily and cost-effectively into the cross members or cross struts of the frame, which conduct away force and have corresponding, prepared indents (female elements) and can be welded quickly to the latter. The cross struts are in particular chamfered on their upper side, so that stones resting on the clean water side of the screening element can be pushed to the calm zone, and failure of the device, because of blockage, is avoided.

Since the flat screening element embodiment is limited in terms of its efficiency, at least for certain applications, a curved screening element is normally preferably used to achieve increased efficiency. In the curved screening element, the screening rods are arranged in the form of an arc or circle, mainly over an angle of 90 degrees to 120 degrees. The shape of the screening rods is preferably selected such that the screening rods can be nested or arranged in a half-moon configuration of 120 degrees on a blank, so that a plurality of screening rods can be cut in succession without substantial scrap.

The water has to overcome hydraulic losses owing to the through flow between the screening rods. In the case of an arcuate or round screening element, the through flow directions will not be perpendicular to the surface of the screening rod at the outer corners, but rather is always somewhat oblique. This results in relatively large resistances being produced at the outer ends owing to the relatively greater distance traveled by the water between the screening rods. In order to compensate for this problem, the screening rods are made thinner in the region of the ends than in the center of the screening rods. The arcuate or round screening element is subjected to tensile stress so that the screening rods can basically be made flatter than the screening rods which are configured for compression. As a result, a) because of smaller resistances between the screening rods, the system can be operated with relatively high hydraulic power, and
b) owing to the flatter screening rods with significantly less material and owing to the technique of creating adjacent half-moons with less scrap, it is possible to produce a cost-effective screening element with a significantly higher throughput rate of approximately 30 degrees.

The screening device according to the invention is mainly used for arranging and protecting overflow weirs of mixed and separating systems, in order to protect bodies of water against hygiene articles, such as toilet paper, etc. The screening wiper device according to the present invention is preferably driven without outside or extraneous energy by a waterwheel, or can also be powered by a hydraulic motor, an electric motor, a pneumatic motor, etc. The waterwheel can also drive a pump, which in turn drives a hydraulic piston and/or motor of the wiping element for the screenings.

Further features of the invention are present in the subclaims, the description of the figures and the figures themselves, in respect of which it should be noted that all the individual features and all the combinations of individual features represent further inventive refinements.

DETAILED DESCRIPTION OF THE PREFERRED EMBODIMENTS

Figure 1:
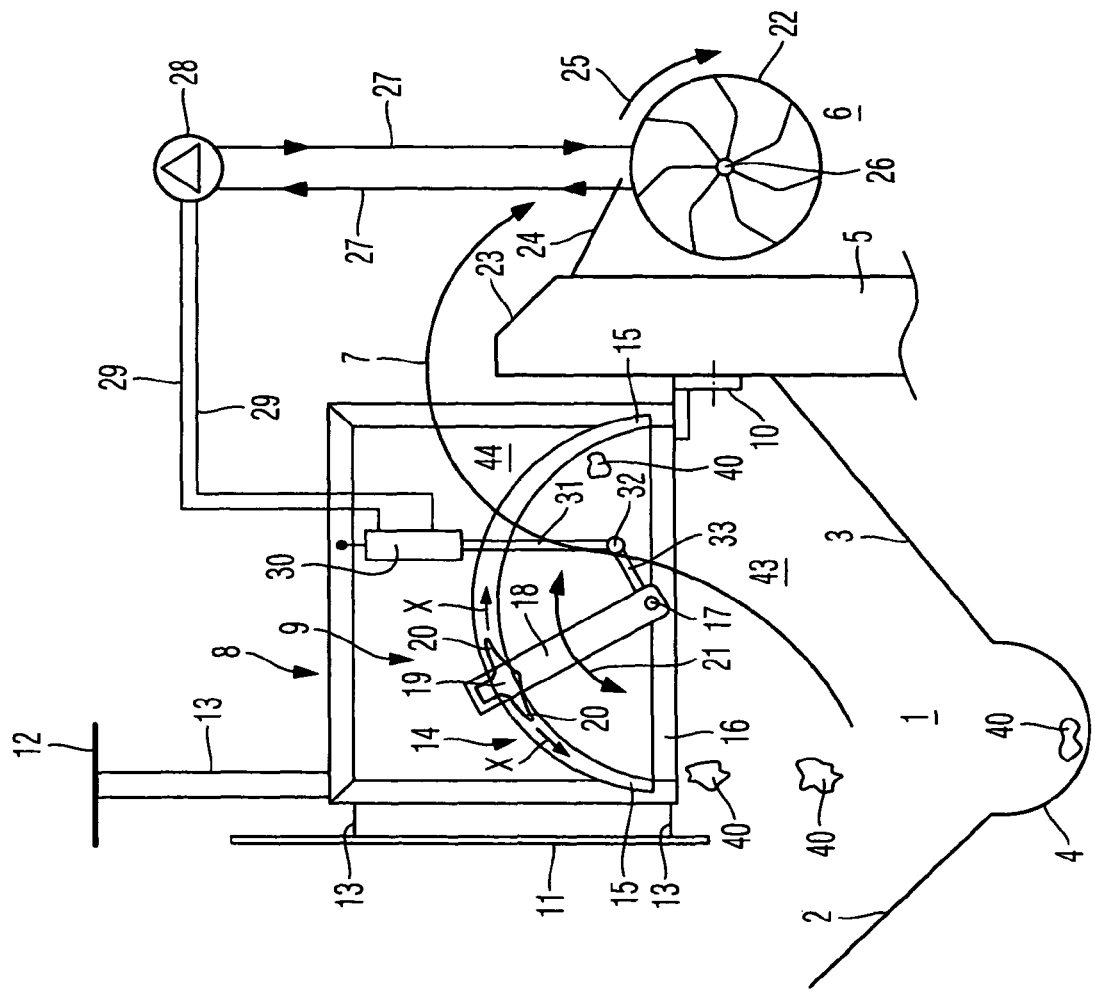
FIG. 1 is a schematic illustration of a cross section through the longitudinal extent of a channel and an overfall wall which bounds the channel laterally, with a screening device which is embodied as a curved screening element, and with a water drive for the curved screening element.
Figure 4:
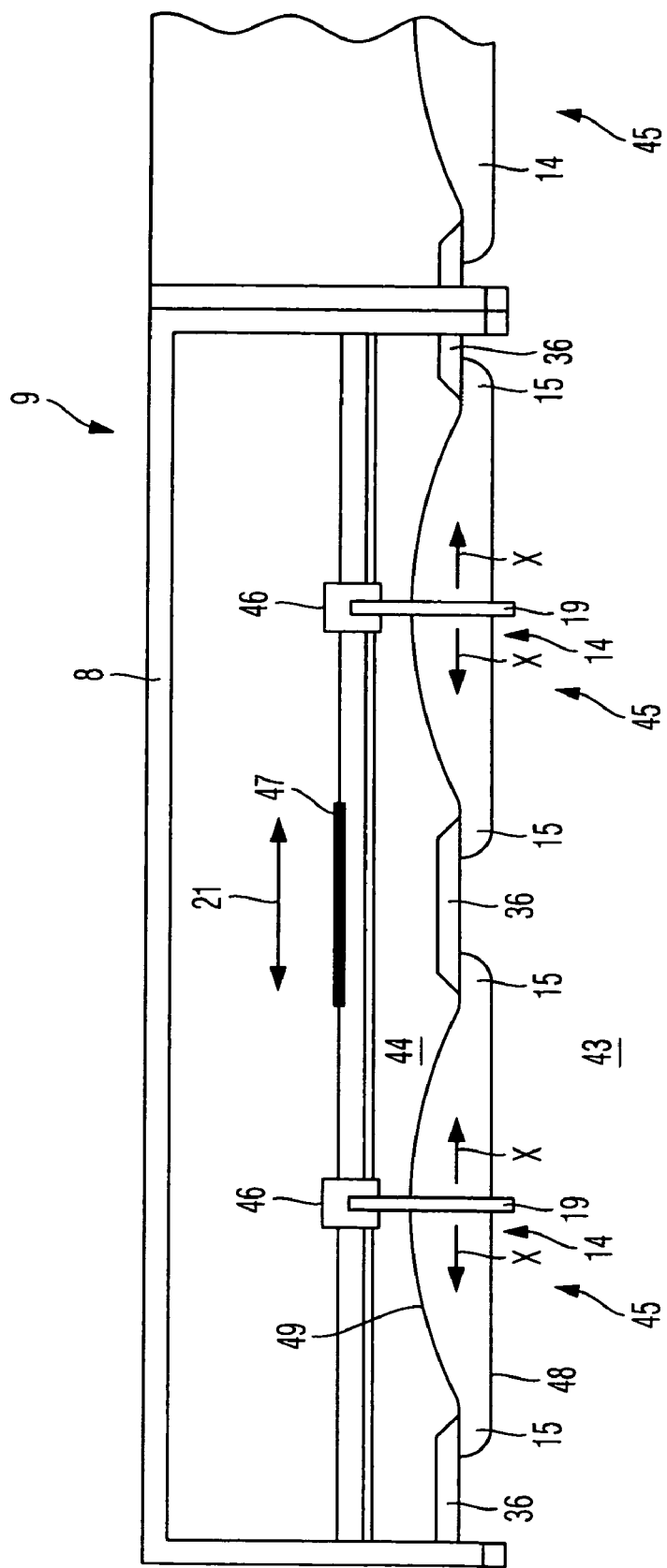
FIG. 4 is a schematic illustration of a section of a screening device which is embodied as a flat screening element.

For purposes of description herein, the terms "upper", "lower", "right", "left", "rear", "front", "vertical", "horizontal" and derivatives thereof shall relate to the invention as oriented in FIGS. 1 and 4. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 illustrates a wastewater channel 1 with inclined floor sections 2 and 3 which extend toward one another, and a dry weather gully 4 which connects the two floor sections 2 and 3 in the region of their lower ends. The wastewater channel 1 is bounded laterally in the region of the floor section 3 by a vertically arranged overfall wall 5, which extends significantly beyond the level of the floor section 3. If an increased volume of wastewater flow occurs when the drainage system is being operated as a mixed system or a separating system, some of the wastewater can flow over the overfall wall 5, pass from there into an overflow channel 6, which is located next to the overfall wall 5, and then pass from the overflow channel 6 into a body of water or receiving water course. The line 7 (FIG. 1), which is indicated with an arrow, shows the direction and way in which the flow passes from the wastewater channel 1 into the overflow channel 6 when there is an increased occurrence of wastewater, particularly during a heavy rain event. In particular, in the case of heavy rain, considerable quantities of contaminants, such as hygiene articles, paper and plastics, etc., can flow into the receiving water course or the body of water if no screening device is provided.

A frame 8 extends essentially over the length of the wastewater channel 1, serves to hold a screening device 9, and is arranged above the wastewater channel 1. The frame 8 is connected, on the one hand, via a fitting angle 10 to the overfall wall 5 on the side facing the wastewater channel 1, and, on the other hand, to a channel wall 11 and/or to a channel cover 12 by struts 13. The screening device 9, which is connected to the frame 8, is in FIGS. 1-3 embodied as an arcuate or round screening element with a plurality of identical screening rods 14 arranged one behind the other with respect to the plane of the diagram in FIG. 1. Screening rods 14 are configured in an essentially semicircular curve, with the adjacent screening rods being 4 to 6 mm apart, and with the two free ends 15 of each of the screening rods 14 being directed or oriented downwardly. The ends 15 of screening rods 14 are connected to the frame 8 in the region of a lower, horizontally arranged strut 16. Each screening rod 14 is therefore curved inwardly in a downstream direction on the wastewater side facing the channel, and is curved outwardly in an upstream direction on the side facing away from the channel, that is to say, the clean water side. The screening rods 14 extend over an angle of 180 degrees, but smaller angles are also conceivable, for example angles of 90 to 120 degrees, in particular an angle of 90 degrees or an angle of 120 degrees.

The illustrated screening rods 14 (FIGS. 1-3) have a smaller degree of curvature on the wastewater side than on the clean water side.

In the region of half the length of the frame strut 16, a plate-shaped lever 18 is mounted, so as to be freely pivotable about an axis 17, with the large surface side of the lever 18 being arranged parallel to the large surface side of the respective plate-shaped screening rod 14 and perpendicular to the longitudinal extent of the axis 17. The lever 18 is guided in the frame 8 along a semicircular path and accommodates a wiping device, which is arranged between adjacent struts 13, and includes a plurality of wiping blades or elements 19. The direction of movement "X" of the wiping elements 19 is therefore bidirectional along the semicircular path. Each wiping element 19 has, in its direction of movement "X" and its opposing direction of movement "X", two end projections or ends 20 which extend in the direction of the semicircular path, and which terminate in a cone shape. Each wiping device 19 is arranged generally between a pair of adjacent screening rods 14. A radially outwardly extending section of each wiping element 19, which faces the clean water side thereof, serves to support the wiping element 19 in a holder, which is connected to the lever 18. To this extent, the wiping elements 19 are disposed radially over the clean water side boundary of the screening rods 14. Each wiping element 19 also has on its downstream or radially inner side, that is to say, on its wastewater side, an inwardly extending region 42 located between the two end projections 20, which region extends over the wastewater side contour of the screening rods 14. The end projections 20 are located between the adjacent screening rods. Owing to the shape of the respective end projections 20, movement of the wiping device causes screenings to be fed to either the wastewater sides 43 of the screening rods 14, or to the clean water sides 44 of the screening rods 14, depending on where the screenings abut on the contoured surfaces of the wiping elements 19.

If a very large flow volume of wastewater occurs, resulting in wastewater passing over the overfall wall 5, debris or contaminants which are carried along in the wastewater, and which are referred to herein by the reference number 40 (FIGS. 1 and 11), such as hygiene articles, paper, plastics, etc., are held back or captured by the lower or downstream sides of the screening rods 14 as the wastewater passes top to bottom through the screening device 9. Furthermore, when heavy rain occurs, rainwater initially flows from the area around the screen in a top to bottom direction through the screening rods, and can deposit rocks or other debris on the top or upstream sides of the screening rods, which also must be cleared away to prevent blockage. In the example illustrated in FIGS. 1-3, the debris or screenings are cleared away from the screening device 9 by the levers 18, which can pivot to and fro in the directions of the double arrow 21 (FIG. 1), and the wiping elements 19 which are connected to levers 18. The levers 18 are pivoted to such an extent that the wiping elements 19 move the screenings to the ends 15 of the screening rods 14. The center point of the arc of the clean water side end face 49 of each of the screening rods 14 is concentric with the pivot axis 17 of the lever 18 and the respective wiping elements 19, which also move along a circular arc.

In one working embodiment of the present invention, the levers 18 are driven together with the wiping elements 19 by or a waterwheel 22. There is therefore a drive which does not require outside or extraneous energy, since the waterwheel 22 is arranged after the overfall wall 5 in the direction of flow of the wastewater. As is apparent from the arrow line 7 (FIG. 1), the wastewater passes behind the overfall wall 5, provided with a slope 23, onto a discharge plate 24, which is arranged obliquely and connected in the lower region of the slope 23 to the overfall wall 5. The wastewater then passes from discharge plate 24 to the waterwheel 22, which rotates in a clockwise direction according to the direction 25 (FIG. 1) of the arrow. The waterwheel 22 first drives a belt 27 via a waterwheel shaft 26, which in turn drives a pump 28, such as a hydraulic pump, via belt 27. Pump 28 is connected by pressure lines 29 to a piston 30, which is mounted on the frame 8, and whose piston rod 31 is connected by a joint 32, which is arranged at a distance from the axis 17, to a fitting 33 connected to all of the screening rods 14. A controller (not shown) for the hydraulics causes the pivoting movement of the levers 18 to be reversed in the direction of the other end 15 of the screening rods 14 when the wiping devices reach the end position adjacent to one end 15 of the screening rods 14, so as to ensure a continuous cleaning effect of the screening system in both directions.

In the embodiment illustrated in FIG. 1, the mechanism which transmits the movement of the waterwheel 22 to the levers 18 and the wiping elements 19 is arranged outside the overfall wall 5 and is located above the maximum liquid level.

Figure 2:
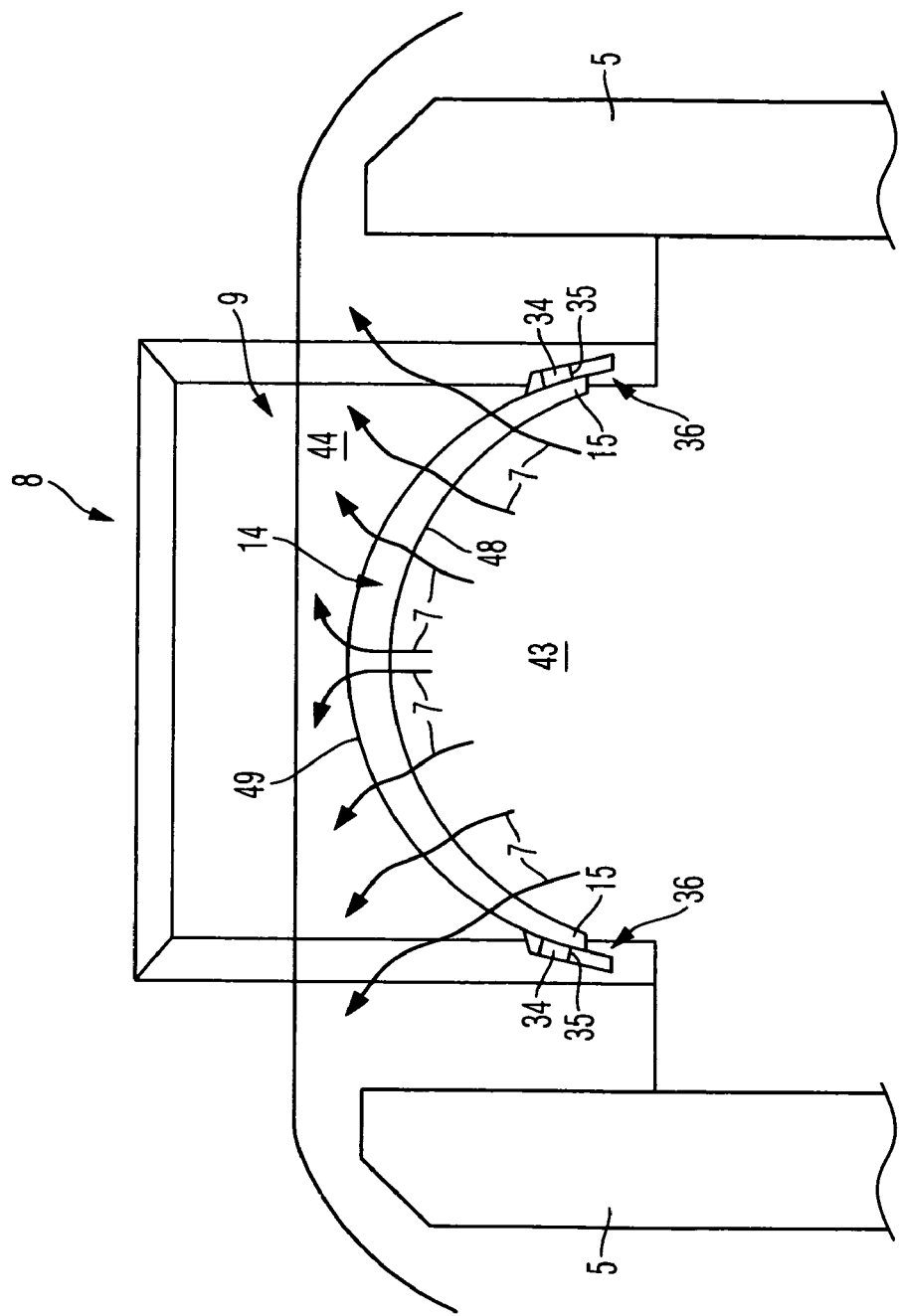
FIG. 2 is a schematic illustration of a detail of the screening device showing the flow through the gap between two adjacent screening rods of the screening device.

FIG. 2 illustrates a variant of the channel structure which is modified compared to the illustration in FIG. 1, and in which the screening device 9 is arranged between two overfall walls 5, which are arranged parallel to one another. Here, when overflow occurs, there is a flow through the screening device 9, which for reasons of clarity is illustrated without a wiping element for the screenings, according to the flow arrow 7. The illustration shows that in the region of the apex of each screening rod 14 the direction 7 of flow is radial, while the direction 7 of flow adjacent to the ends 15 of the screening rods 14 is not radial, but rather extends along the shortest path through the gap between adjacent screening rods 14, that is to say, obliquely. Since the screening rods 14 taper toward their ends, the flow paths, and hence the flow rates, through the gaps between adjacent screening rods 14 from the centers of the screening rods 14 to their ends 15 are approximately the same. The screening rods 14, which taper from their centers along their axes of symmetry to the ends 15, are accordingly flatter or vertically narrower toward their ends 15. Each screening rod 14 is preferably manufactured from a plate, and therefore has an identical thickness. Each screening rod 14 in FIGS. 1-3 has a crescent shape, with a smaller degree of curvature on the wastewater face 48 than on the clean water face 49. In the exemplary embodiment according to FIGS. 1 and 2, the external contours of the screening rods 14 have a circular shape. More specifically, each curved screening rod 14 is configured in such a way that it has a smaller radius on the wastewater face 48 than on the clean water face 49. Each end 15 of each of the screening rods 14 has a fitting 34 (male element) which is several millimeters in height and width, and is plugged into an indent or slot 35 (female element) of an associated cross member 36 on the frame 8, and is welded therein to permanently connect the screening rod 14 and cross member 36.

Figure 3:
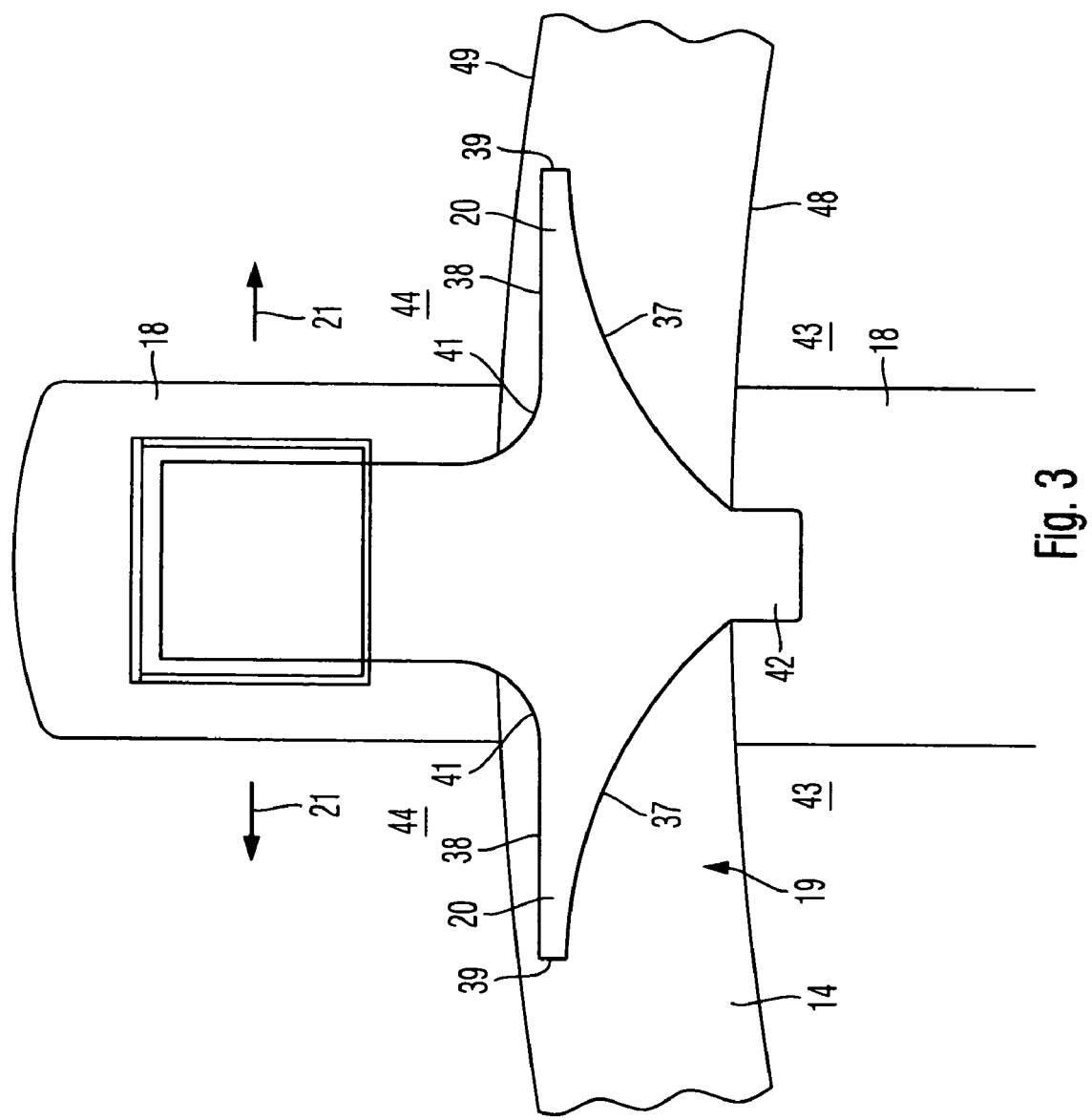
FIG. 3 is a schematic illustration of a detail of the screening device shown in FIG. 1, clarifying the arrangement and configuration of a wiping device of the device for clearing away the screenings.

In the embodiment shown in FIGS. 1-3, the screening rods 14 are therefore curved downwardly in order to increase the through flow for the same area or footprint. The flow resistance is virtually the same everywhere along the screening device 9, since an oblique flow occurs at the ends 15 of the rods, and the rod ends are flatter or vertically narrower, and therefore equalize the flow distance and associated flow resistance. As a result, approximately the same flow resistance occurs when there is a through flow between the screening rods 14.

The arcuate or round screening device 9 shown in FIGS. 1-3 is configured for improved tensile stress resistance, with the result being that the screening rods 14 can basically be made flatter or vertically narrower. As a result, a higher hydraulic power is produced because of the reduced flow resistance between adjacent screening rods 14. Also, the flatter screening rods 14 require significantly less material for manufacture.

FIG. 3 shows the basic configuration of the wiping element 19 for screenings, which is used in the screening device 9 between adjacent screening rods 14. Wiping element 19 is embodied as a plate-shaped component, which may be made as a plastic component from polyethylene or the like. The wiping element 19 is mounted on the lever 18. In the exemplary embodiment of FIGS. 1-3, the ends of projections 20 on wiping element 19 are configured in the shape of a cone. Each wiping element 19 has on its wastewater side, an inwardly curved surface portion 37 of end projection 20, which as best shown in FIG. 3, is located laterally between adjacent screening rods 14. Each wiping element 19 also has a clean water face 38, which is also located laterally between adjacent screening rods 14, and which is of an essentially linear or straight design, and extends largely in the tangential direction of the screening rods 14. That portion of the clean water face 38, which is oriented away from the free, obtuse end 39 of the wiping element 19, is adjoined by an inwardly curved end face section 41 of the end projection 20, which is directed essentially radially outward in its end region. The two curved surfaces 37 of wiping element 19 come together at a radially inwardly or downstream projection 42, having an essentially rectangular side elevational shape. This basic configuration is designed such that, when each wiping element 19 moves in the direction 21 of the arrow, screenings which have collected on the wastewater side 43 of the screening device, and under certain circumstances between the screening rods 14, are peeled off and shifted in a generally sideways and downward direction in a gentle way, and over a relatively short distance, from the gaps between adjacent screening rods 14, as a result of contact by wiping blade faces 37, and are transported laterally to the cross members 36. Calm zones are formed in the regions of the cross members 36 and the ends of screening rods 14. The screenings collect at the calm zones, and drop downwardly under gravitational forces in order to be discharged from the channel. In contrast, when the wiping elements 19 move in the clearing direction, the upper clean water faces 38 and curved end face sections 41 of wiping elements 19 are shaped so that debris or materials which have become lodged on and/or stuck between the upper regions of the screening rods 14 are fed or shifted out of the gaps formed between the screening rods 14. More specifically, when the wiping elements 19 move, the debris taken up or dislodged by the end faces 38 and/or 41 is pressed upwardly out of the gap formed between the screening rods 14 by the curved end face sections 41 of wiping elements 19, and deposited onto the upper surfaces of cross members 36.

Reference is made to the later statements with respect to the various different advantageous embodiments of the respective wiping element.

In contrast to the illustrations in FIGS. 1 to 3, which relate to the schematic illustrations of the curved screening system, FIGS. 4 to 11 show schematic illustrations of the screening device 9 which is embodied as a flat screening system.

This flat screening system is used (FIGS. 1-4) in a channel structure or the like, such as the one described above with respect to the arcuate or round screening system (FIGS. 1-3), and the flat screening system may also driven by a waterwheel 22.

Figure 7:
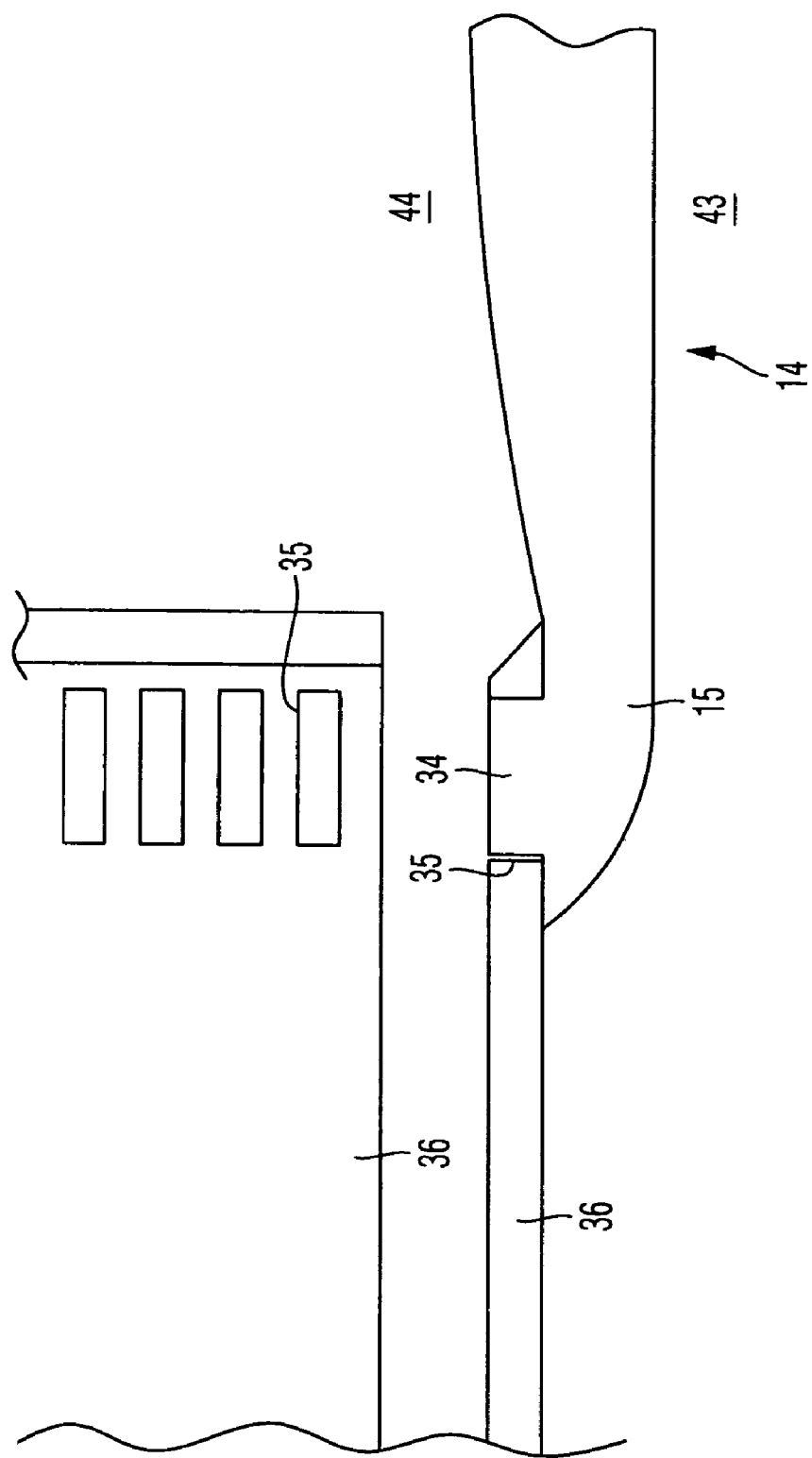
FIG. 7 is a schematic illustration of a detail of the screening device clarifying the support of the respective end of the screening rod in a frame of the screening device.

FIG. 4 illustrates an arrangement of screening devices which are of modular design, with one module being shown completely, and the module adjoining this module being shown only in the adjoining region. Each module has two rows 45 of screening rods 14, with the screening rods of the respective row 45 being arranged one behind the other with respect to the orientation of the plane of the diagram in FIG. 4. The respective screening rods 14 are similar to the screening rods of the curved screening system, insofar as they become flatter toward their opposite ends 15. Each screening rod end 15 is provided with the above-described male fitting 34, and the cross member 36, which forms part of the frame 8, is provided with the slot or indent 35, as is illustrated in FIG. 7, showing a side view of the cross member 36 and screening rod 14, as well as a plan view of the cross member 36.

Figure 5:
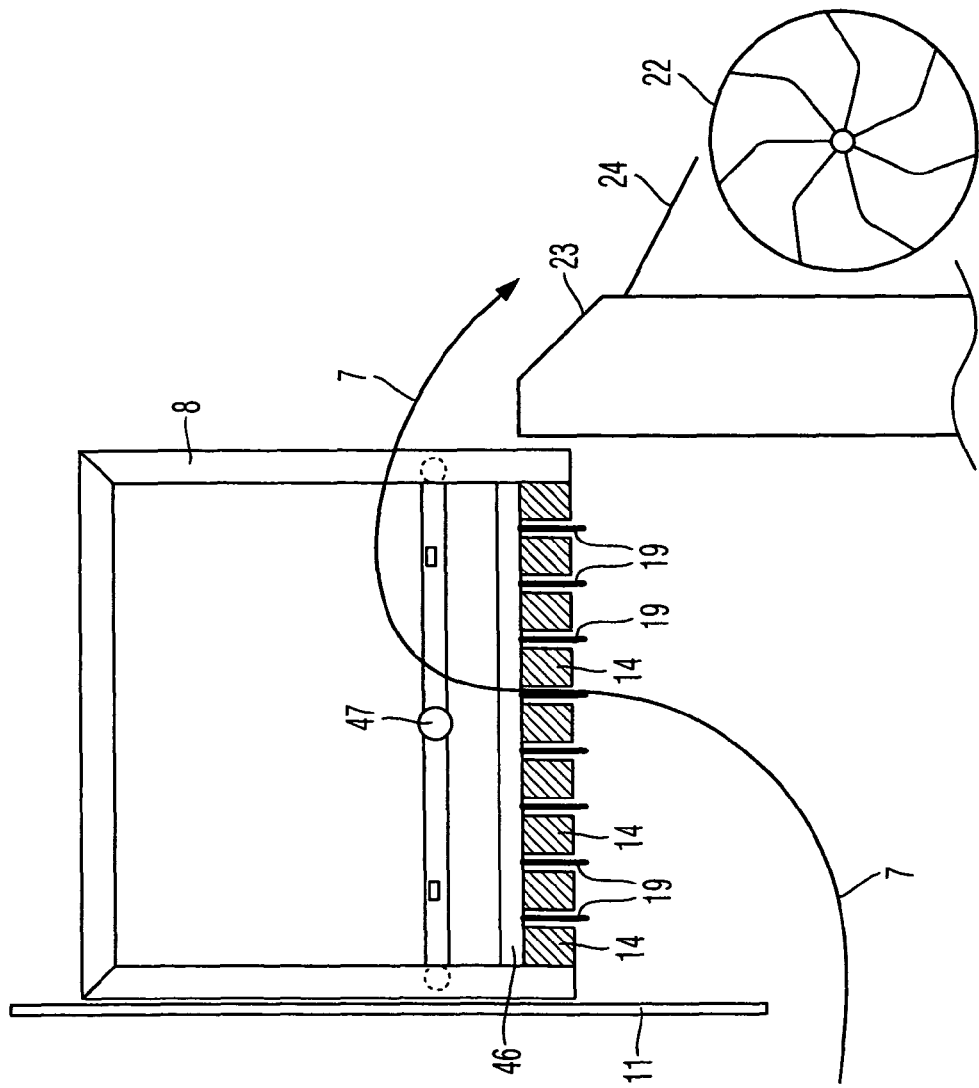
FIG. 5 is a schematic illustration of a section of the screening device which is shown in FIG. 4 perpendicular to the section according to FIG. 4, with the drive of the screening device.

With respect to each particular row 45 of screening rods 14, wiping elements 19, which are illustrated in a highly simplified way in FIGS. 4 and 5, are arranged between adjacent screening rods 14. Wiping elements 19, which protrude slightly beyond the screening rods 14 on the wastewater faces 48 thereof, are mounted on the clean water side 44 in carriages 46 which are supported on the frame 8. The carriages 46 can be moved by a drive 47, which is also mounted on the frame 8, and which is driven by the waterwheel 22, as described above with respect to the curved screening system. This results in the direction of movement "X" of the wiping elements 19.

Figure 6:
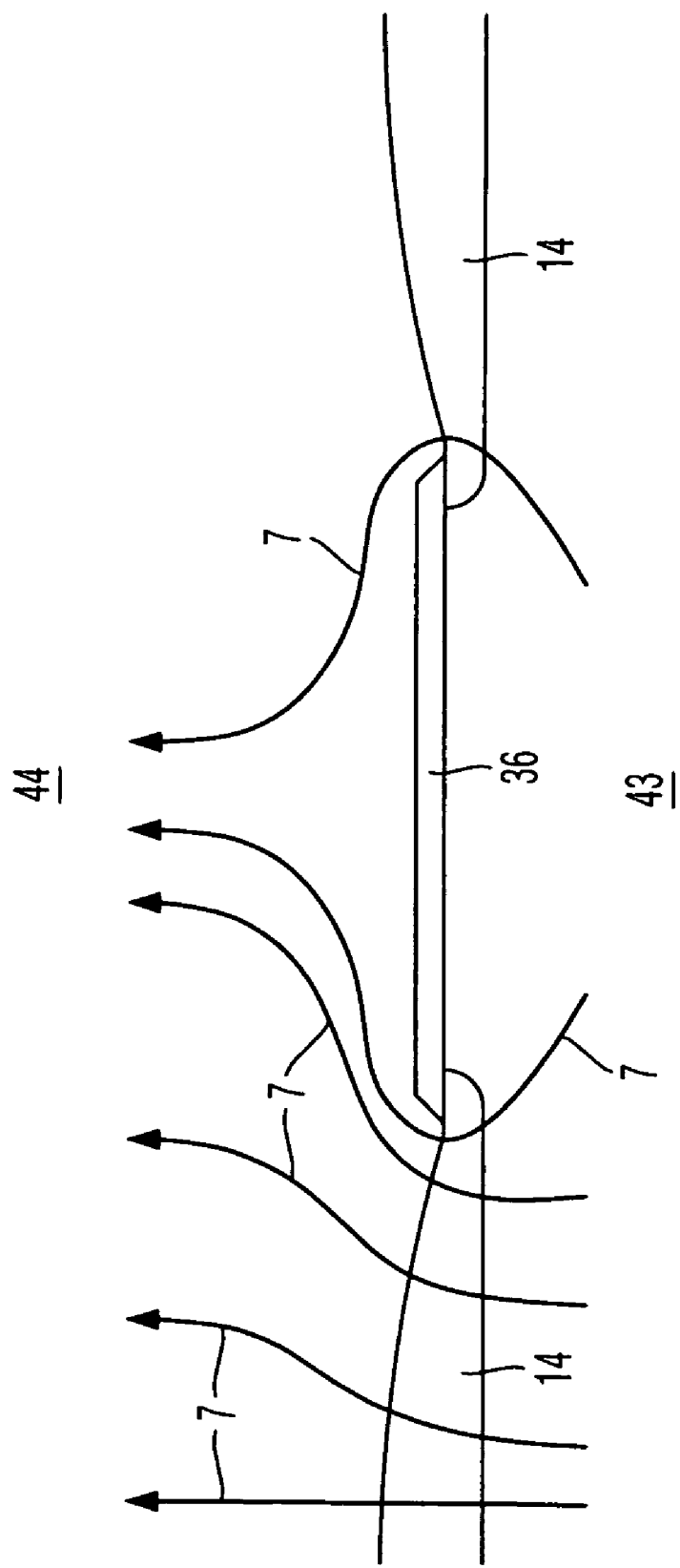
FIG. 6 is a schematic illustration of a detail of the screening device according to FIGS. 4 and 5 clarifying the flow through the gap between adjacent screening rods.

FIG. 6 illustrates the flow of wastewater through the screening rods 14 in the region of adjacent rows 45, and the formation of a calm zone in the region of the cross member 36, which connects two adjacent rows of screening rods. In accordance with the illustration in FIG. 2, it is apparent from FIG. 6 that, owing to the shape of the screening rods 14, approximately the same flow resistance occurs when there is a flow between the rods 14. The flow resistance is virtually the same everywhere in the gap between adjacent rods 14, since there is oblique flow at the ends of the rods, and the rods are flatter or vertically narrower there to equalize the distances.

FIGS. 4, 8, 9 and 10 illustrate different embodiments of the respective screening rods 14. All the embodiments have in common the fact that the rods taper in a downstream direction toward their ends 15, and therefore becomes flatter. In the embodiment according to FIG. 4, the respective rod 14 is of a symmetrical design, with an end face 48 which faces the wastewater side 43 arranged horizontally, and an end face 49 which faces the clean water side 44 being convex between the ends 15.

Figure 8:
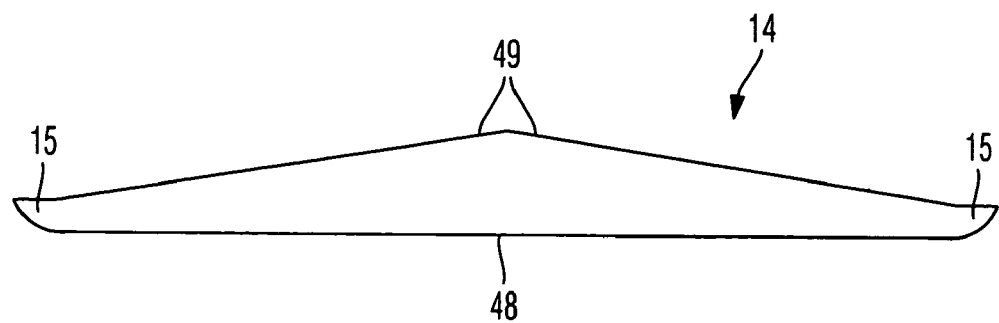
FIGS. 8 to 10 are schematic illustrations of the different basic configurations of the respective screening rod of the flat screening element shown in FIGS. 4 to 7.

The screening rod 14 according to the embodiment in FIG. 8 has an end face 48 which corresponds to the embodiment shown in FIG. 4, and in contrast, the end face 49 is embodied as a pitched roof which rises linearly from the opposite ends.

Figure 9:
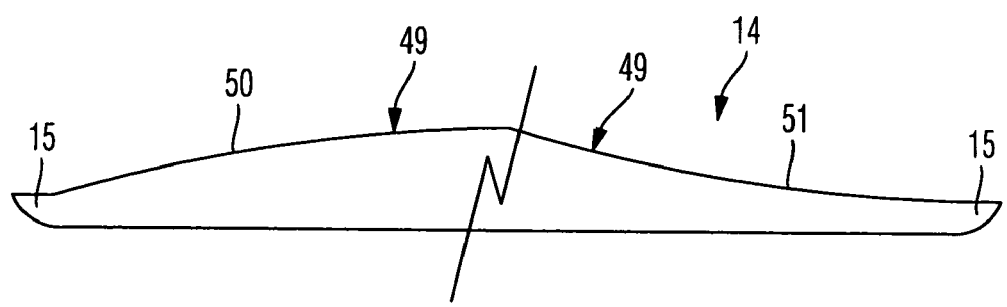
Figure 10:
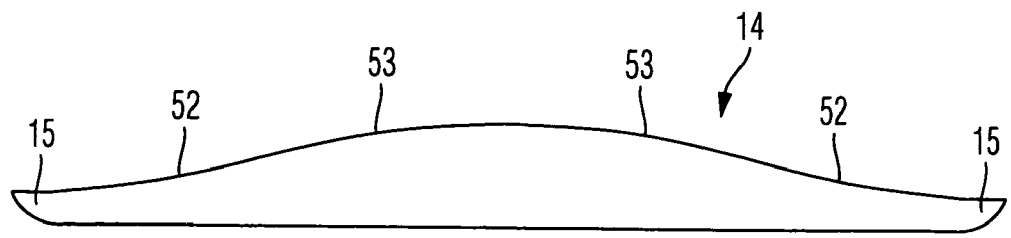

The embodiment shown in FIG. 9 differs from that shown in FIG. 8 in that the end faces 49 are formed by either a convex curved section 50 or a concave curved section 51. The embodiment according to FIG. 10 differs from that according to FIG. 9 in that the end face 49 is formed by first curved sections 52 which extend to the ends 15, and second curved sections 53 which are arranged between the latter.

Figure 11:
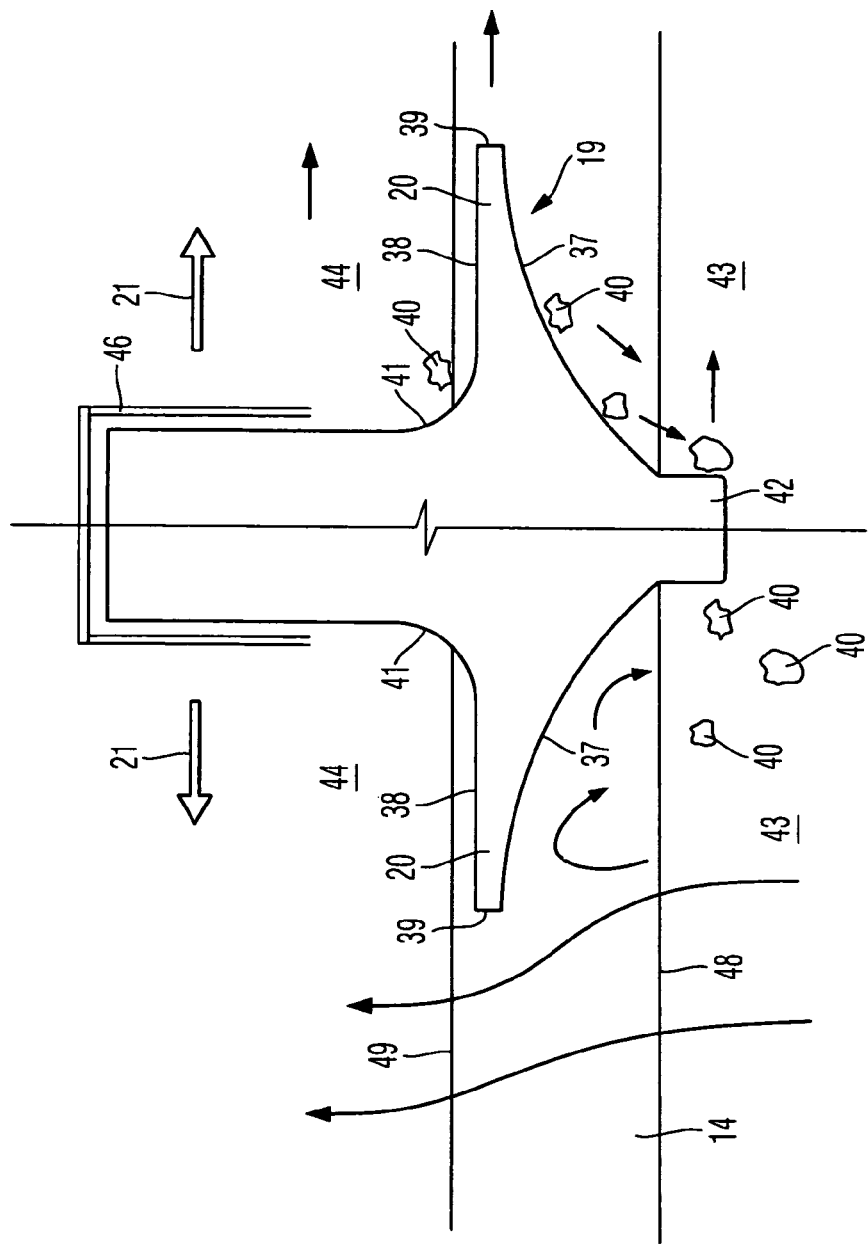
FIG. 11 is a schematic illustration of the embodiment of the respective wiping device in the case of a flat screening element with additionally illustrated flow around the wiping device during operation of the screening device.

FIG. 11 illustrates in detail the shape of the wiping element 19 for screenings which is used in the above-described flat screening system (FIGS. 4-11), its support in the carriage 46 and its arrangement in relation to the respective screening rods 14. The wiping element 19 of FIG. 11 generally corresponds to that described above with respect to the arcuate or round screening system shown in FIG. 3. In addition, FIG. 11 shows the flow conditions in the regions of the wiping element 19 when it moves. The flow pressure is reduced in the region of the long projections or ends 20 of the wiping element 19, and the screenings 40 are raised or cleared from the screening rods 14 in the manner shown in FIG. 11.

FIGS. 12 to 32 illustrate screening devices 9 which are embodied structurally as either curved screening systems or flat screening systems. In order to avoid repetition, parts which correspond in design and/or function to the embodiments described above are denoted by the same reference symbols. In this respect, reference is made to the description above.

Figure 14:
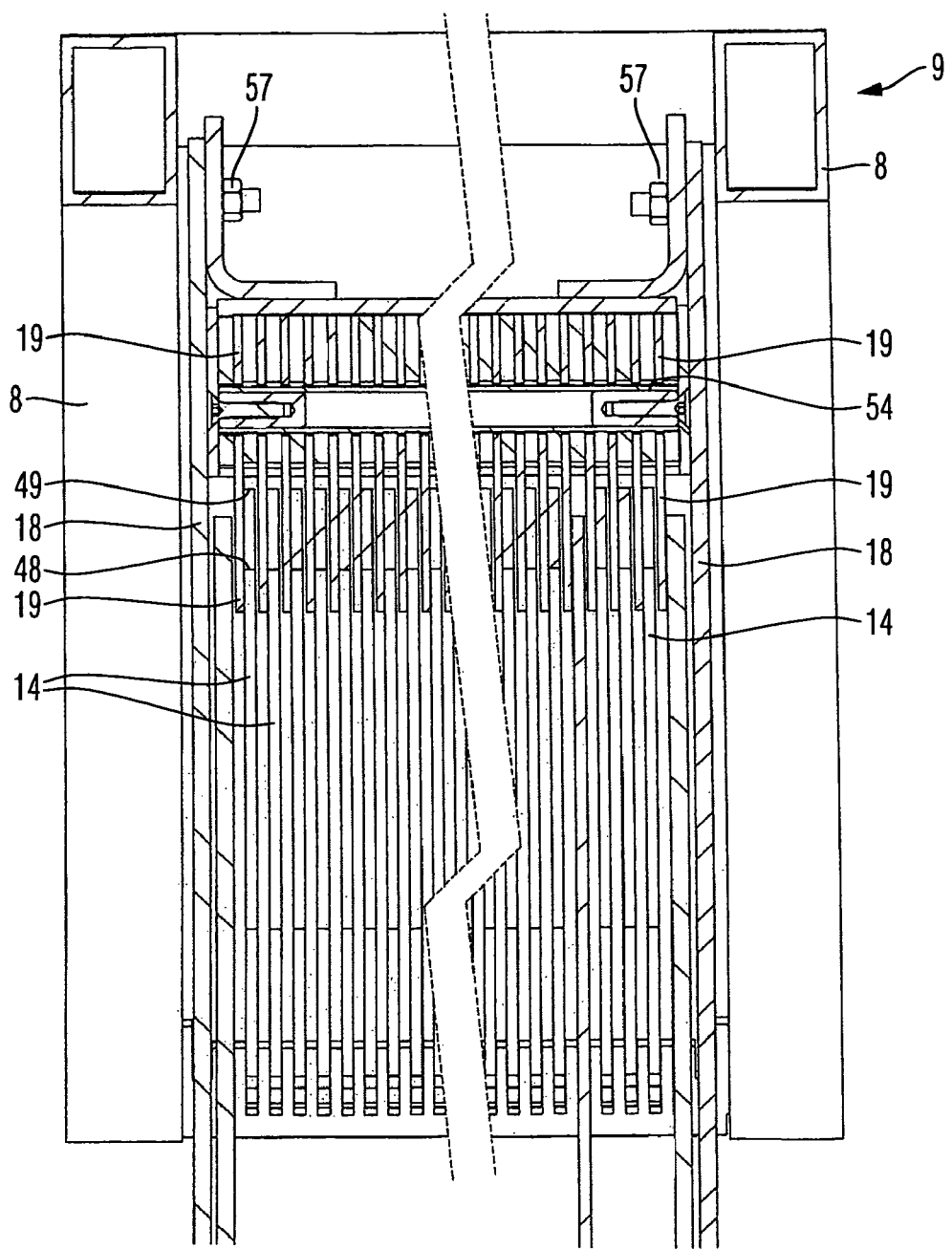
FIG. 14 is a section along the line A-A in FIG. 12.

The arcuate or round screening systems 9 shown in FIGS. 12 and 14-18 have plate-shaped wiping elements 19 which are arranged parallel to one another, and which are plugged one behind the other into a receptacle 54 which is connected to the lever 18. The wiping elements 19 have holes through which a rod 55 is inserted or plugged, with rod 55 being held in the receptacle 54. The wiping elements 19 are mounted in this way with a slight amount of play, and can therefore compensate for tolerances in the gap between adjacent screening rods 14 when the wiping elements move in the tangential direction of the gap. The receptacle 54 is screwed to the lever 18. Elongated holes 56 are provided at that location to radially adjust and set the wiping elements 19, that is to say, shifting wiping elements 19 in the direction of the axis 17, and in the opposite direction when the screws/nuts 57 are loosened. FIG. 14 shows the design of the screening device 9 in an enlarged illustration.

Figure 13:
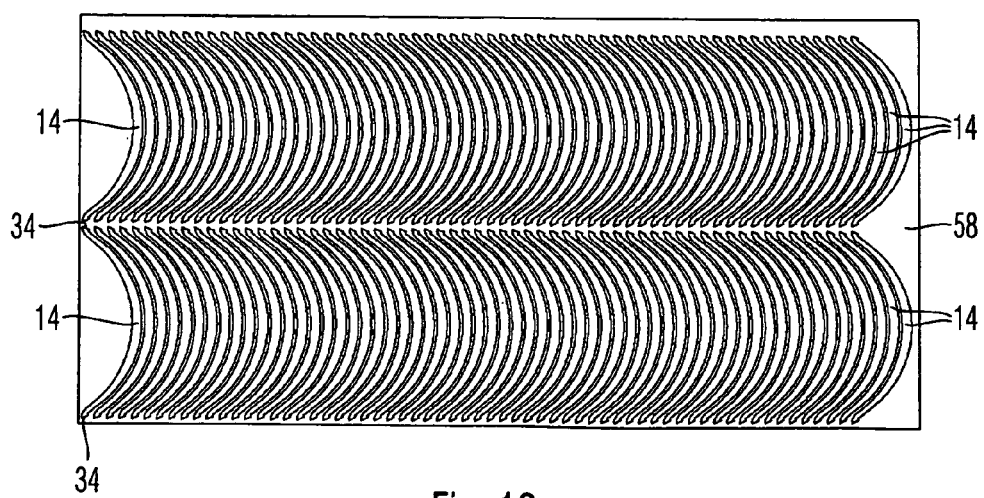
FIG. 13 is a plan view of a plate made of stainless steel with a sectional view through the multiplicity of screening rods which are to be cut out of said plate for use in the screening device according to FIG. 12.

FIG. 13 is a diagram showing the cutting of a plurality of screening rods 14 out of a stainless steel plate or the like which has dimensions of, for example, 1.5×3.0 m. It is illustrated that when the screening rod 14 is embodied as a curved segment which extends over an angle of 120 degrees, specifically 124 degrees, screening rods, including shaped ends 15 with the fittings 34, can be cut with minimum waste or scrap. If the screening rods 14 are cut by a laser, all that it is necessary with this arrangement is to simply position the plate 58. It is treated entirely by laser. This provides a high degree of economy for the manufacture of the screening rods 14.

Figure 12:
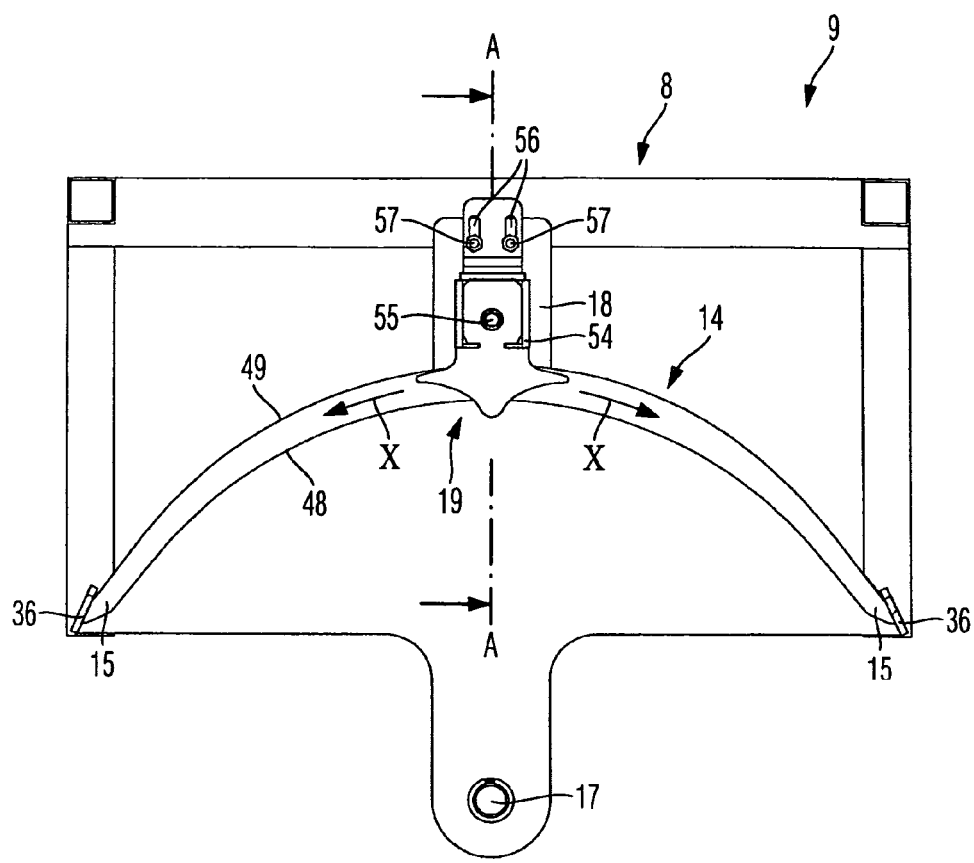
FIG. 12 is a specific configuration of a screening device which is embodied as a curved screening element, in a section parallel to the respective screening rod.
Figure 15:
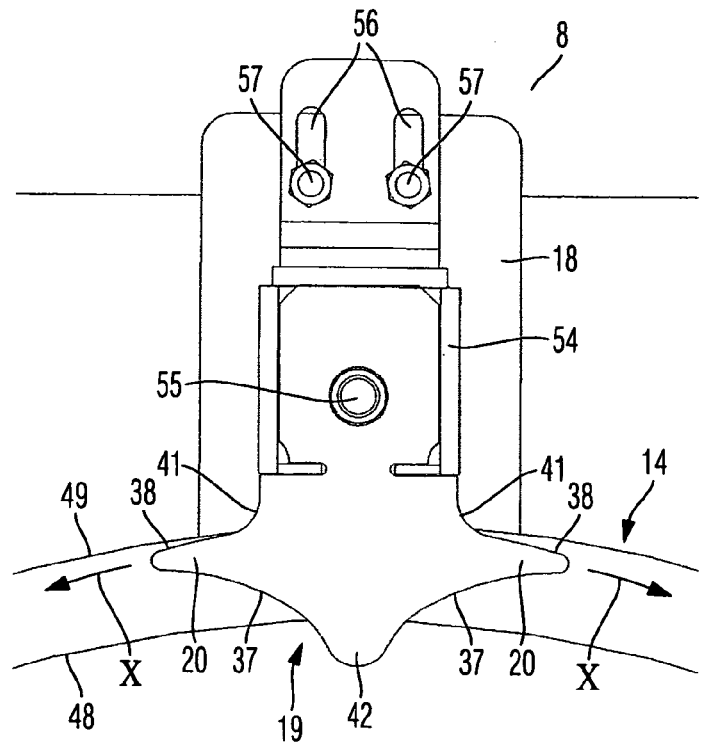
FIG. 15 is an enlarged illustration of the wiping device which is respectively used in the device according to FIGS. 12 and 14, its support and its arrangement with respect to the screening rods illustrated in the center position shown in FIG. 12.
Figure 16:
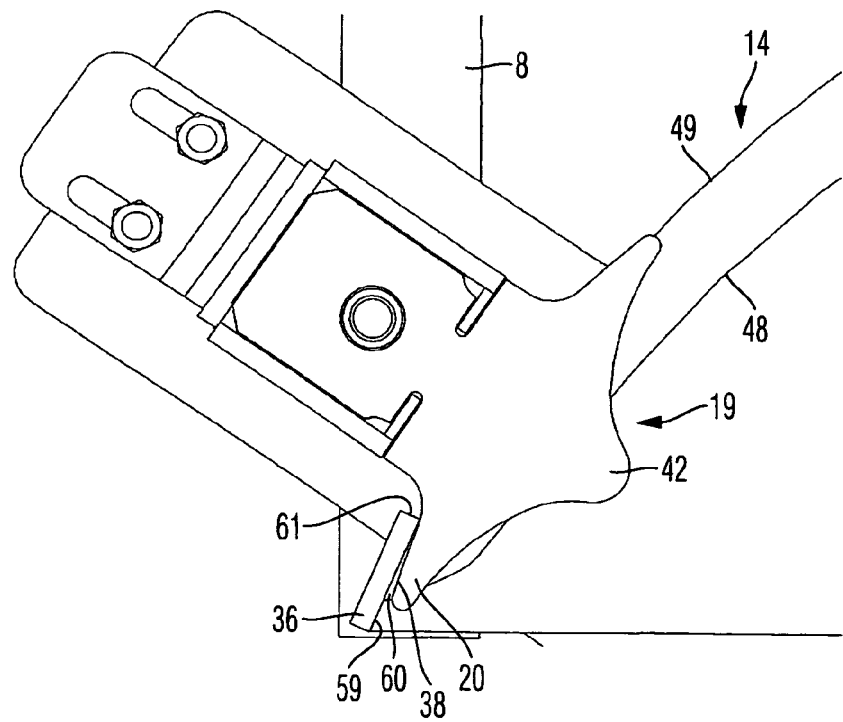
FIG. 16 shows the arrangement according to FIG. 15, illustrated in the left-hand end position of the wiping element in the region of the carrier plate.

FIG. 15 illustrates a wiping element 19 positioned in the location shown in FIG. 12, that is to say, in the region of the central axes of symmetry of the screening rods 14, and therefore above the axis 17. FIG. 16 shows the wiping element 19 in the region of the left-hand cross member 36. From FIG. 16, it is apparent that in the end position of the wiping element 19, the face 38 of the wiping element 19 engages a distance behind the face 59 of the cross member 36 which faces clean water face 38, and is referred to herein as a deposition face. A gap 60 is therefore formed between the wiper face 38 and the deposition face 59. This gap 60 is formed because, in contrast to the embodiments described above, the wiper face 38 is not arranged in parallel with the tangential direction of the wiping element 19. Screenings which have accumulated on the deposition face 59 are therefore not compacted during operation, since the wiper face 38 is not in contact with the deposition face 59 over any significant area, but rather makes at most linear or line contact in the region of the line 61, between the wiping element 19 and the cross member 36. Consequently, the wiping element 19 pushes the screenings away from the cross member 36, in the area of said cross member 36, as the wiping element moves in the tangential direction of the screening rod 14, with the result being that the screenings drop downwardly, as shown in FIG. 11.

Figure 17:
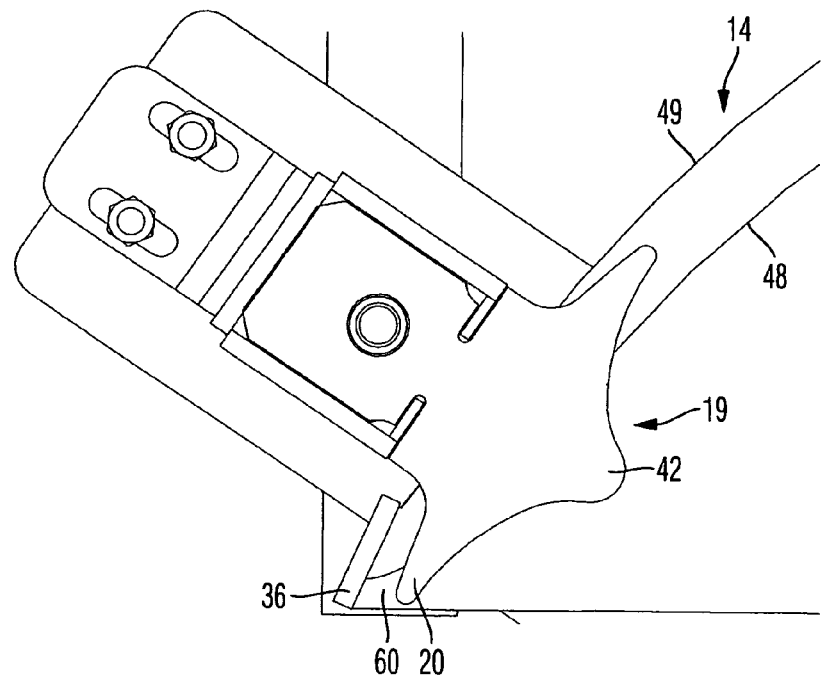
FIG. 17 shows an arrangement of the wiping device which is modified compared to the arrangement of a wiping device according to FIG. 16 and which is arranged closer to the center of gravity of the wiping device.
Figure 18:
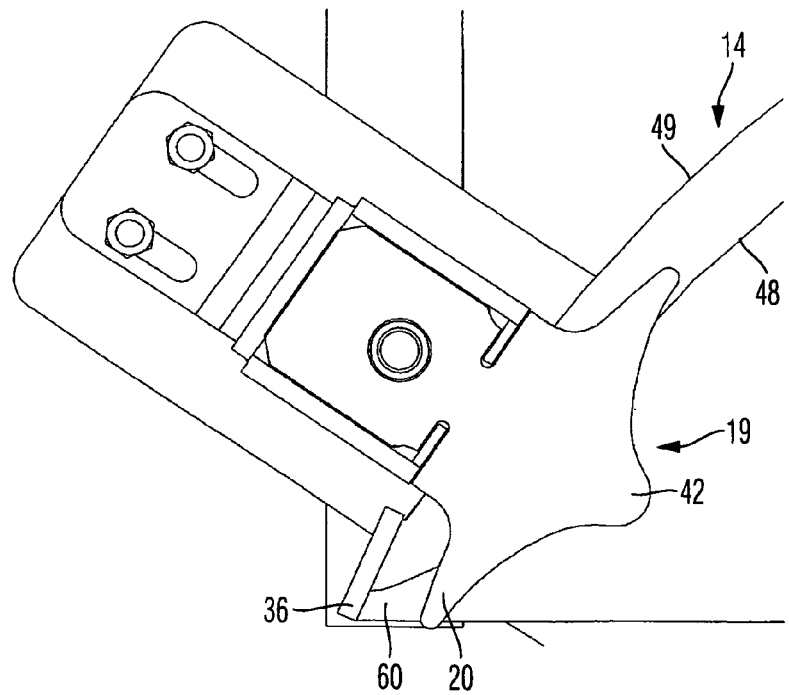
FIG. 18 shows the arrangement according to FIG. 17, with the wiping device positioned to the maximum extent in the direction of the center of gravity of the wiping device.

FIGS. 17 and 18 clarify that, owing to the described support of the wiping elements 19 in the receptacle 54 provided with the elongated holes 56, the thickness or size of the gap 60 which ends in a cone can be adjusted, with a wider gap 60 being illustrated in FIG. 17 than the one in FIG. 16, and a maximum gap 60 being shown in FIG. 18.

From the embodiment shown in FIGS. 15 and 16, it is apparent that the end projections 20 of the wiping elements 19 are arranged in a central position (FIG. 15) between the adjacent screening rods 14, that is radially between the wastewater faces 48 and the clean water faces 49 of the laterally adjacent screening rods 14. The path of movement of each wiping element 19 extends around the center of rotation, which is the center of the circle of the outer or upstream end faces 49 of the screening rods 14. The radius of the inner or downstream end faces 48 of the screening rods 14 is preferably smaller than the radius of the outer or upstream end faces 49 of the screening rods 14. It is also conceivable to move the wiping elements 19 along a circular arc whose center point is the center of the circle of the inner end face 48. Through a corresponding selection, it is possible to cause the wiping element 19 to dip radially during the movement between its end positions, and also to vary the distance between the wiper face 38 and the deposition face 59.

In the embodiment shown in FIGS. 15 to 18, each wiping element 19 is moved on a circular arc whose center point is the center point of the clean water face 49.

Figure 19:
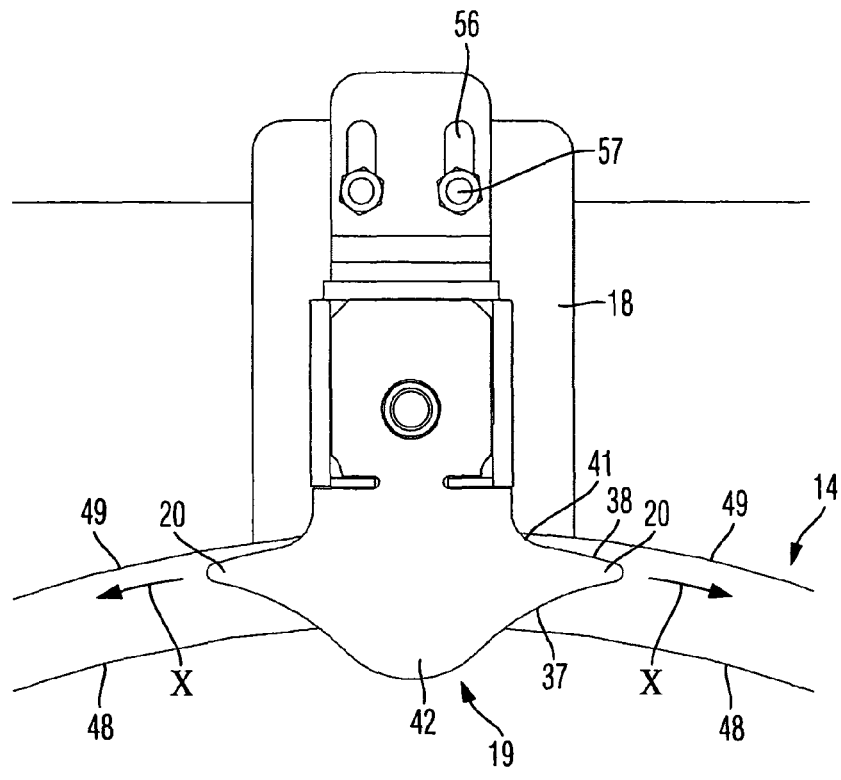
FIG. 19 is an illustration according to FIG. 15, showing a modified wiping device.
Figure 20:
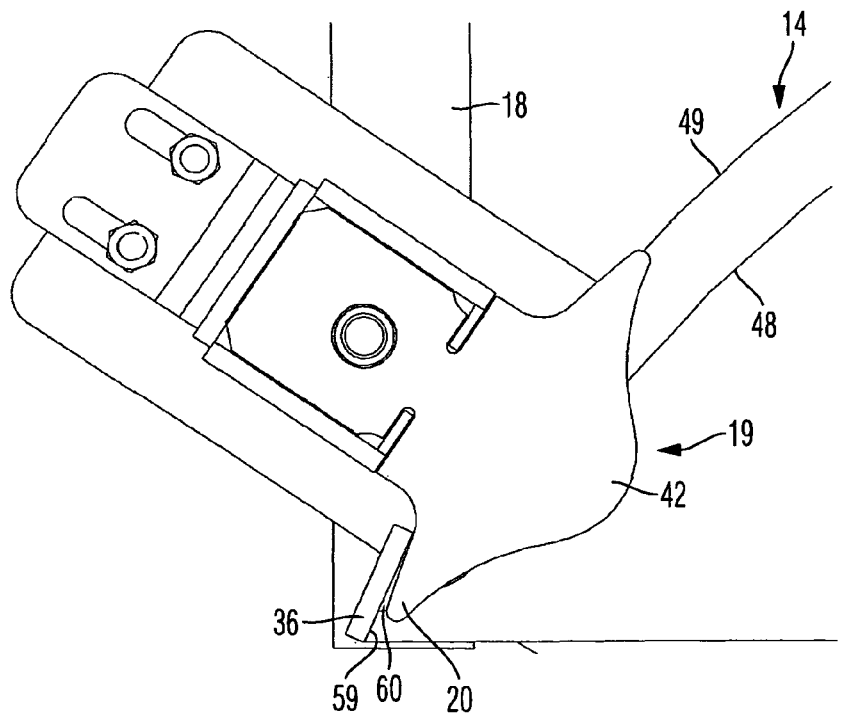
FIG. 20 is an illustration according to FIG. 16 of the modified wiping device according to FIG. 19.
Figure 21:
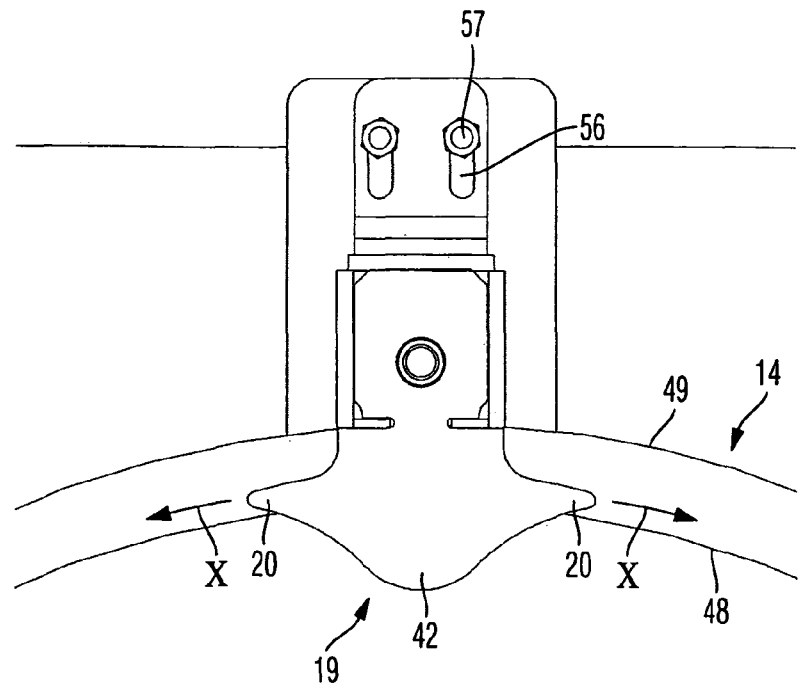
FIG. 21 shows the wiping system according to the embodiment in FIGS. 19 and 20, illustrated in a position according to FIG. 19, but arranged closer to the center of gravity of the wiping device.

FIGS. 19 to 25 show alternative embodiments of the screening device illustrated in FIGS. 15 and 16. In the embodiment according to FIGS. 19 and 20, the lifting-out mechanisms, that is to say the wiper faces 37, are curved inwardly, in contrast to the wiper faces 37 in the embodiment according to FIGS. 15 and 16, which are curved outwardly. Additionally, in the embodiment according to FIGS. 19 and 20, the rounded projection 42 is made significantly thicker than in the embodiment according to FIGS. 15 and 16. FIG. 21 shows a wiping element 19 which is positioned radially further inwardly or downstream compared to that shown in FIG. 19, the result of which is the gap 60 produced at the end position of the wiping element 19 is larger than the gap 60 according to FIG. 20.

Figure 22:
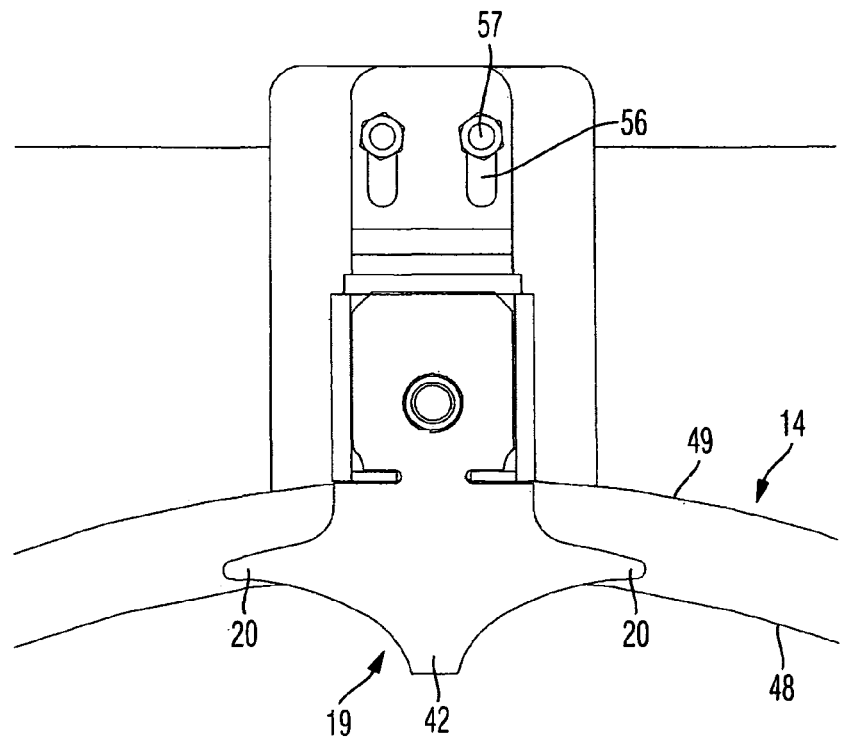
FIG. 22 shows a further modified wiping device in an arrangement according to FIG. 21.
Figure 23:
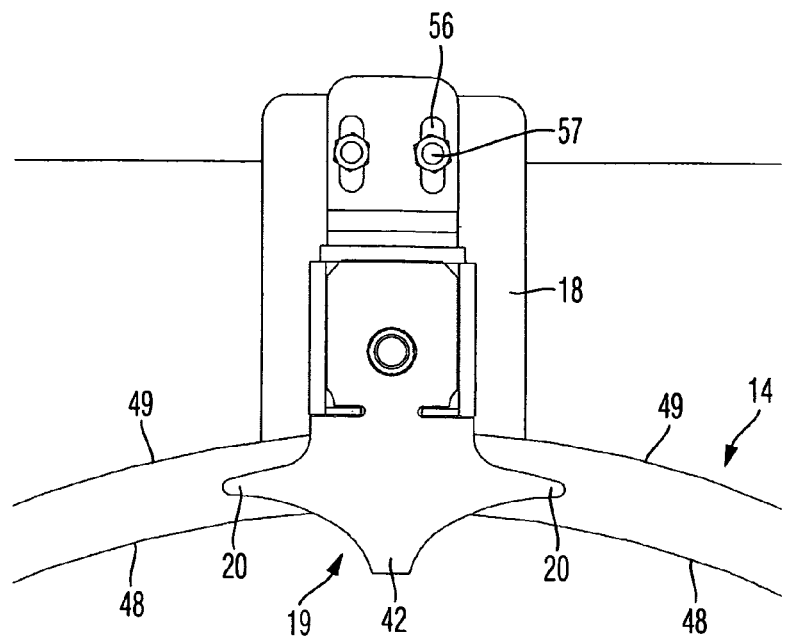
FIGS. 23, 24 show the arrangement according to FIG. 22, with the wiping device arranged further away or at the maximum distance from the center of gravity of the wiping device.
Figure 24:
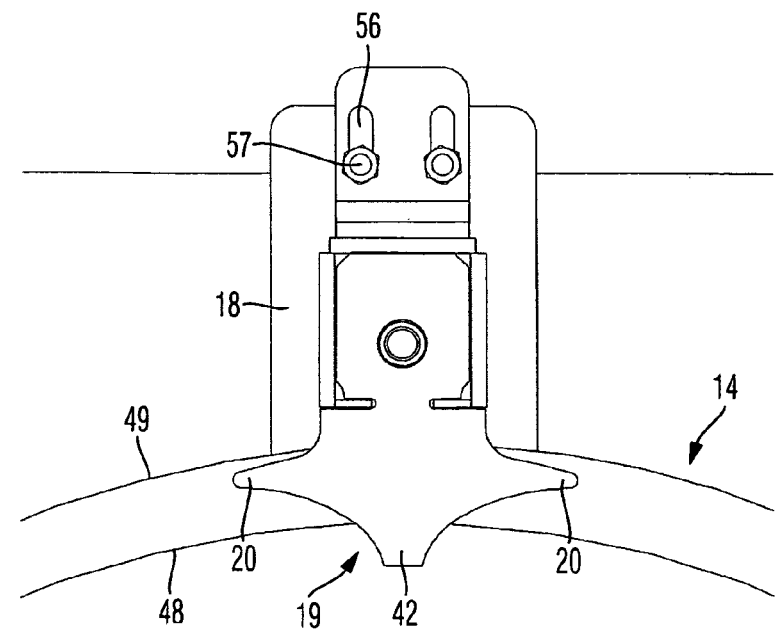

FIG. 22 shows a further modified wiping element 19 in which the downstream projection 42 is flat or straight at the bottom, but otherwise the wiping element 19 corresponds to that according to FIGS. 15 and 16. The wiping element 19 in the embodiment according to FIG. 22 is shown in its central position relative to the pivot axis 17, in which the free ends of the end projections 20 are, as before, arranged laterally between the adjacent screening rods 14, and the downstream projection 42 projects significantly beyond the wastewater face 48. FIG. 23 illustrates the wiping element 19 according to FIG. 22 in a radially center position in which the downstream projection 42 protrudes less far over the wastewater face 48. FIG. 24 shows the wiping element 19 according to FIGS. 22 and 23 in the position in which it is adjusted or arranged radially outwardly or upstream to the maximum extent.

Figure 25:
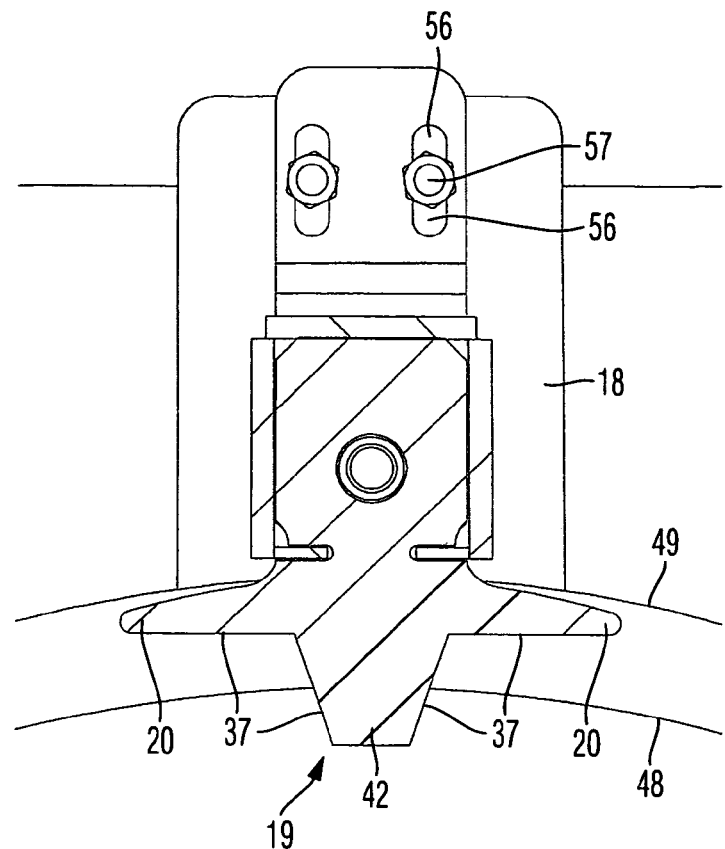
FIG. 25 shows a further modified wiping device in an arrangement according to FIG. 23.

In the embodiment according to FIG. 25, the wiping element 19 extends in a polygonal shape at the bottom. The wiping element 19 is provided in the region of the lower boundary of its end projections 20 with end faces 37 which are arranged in a bent configuration. The downstream projection 42 is arranged between said end faces 37.

Figure 26:
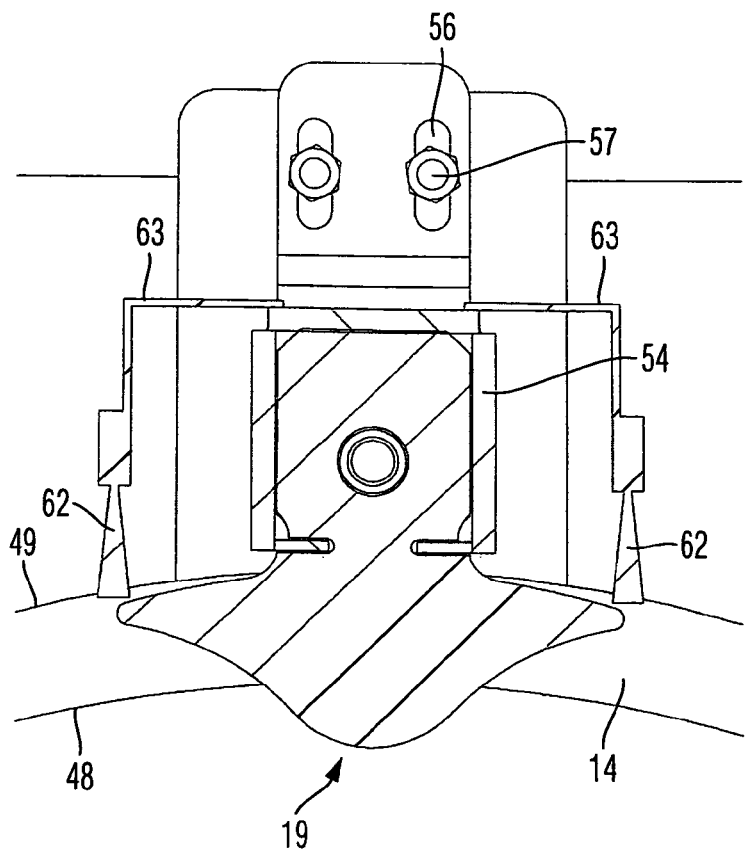
FIG. 26 shows, in an arrangement according to FIG. 21, a wiping device which corresponds to the wiping device shown there, with brushes which are assigned to the wiping device in both directions of movement of the wiping device to clean the gaps between the curved screening rods on the clean water side.
Figure 27:
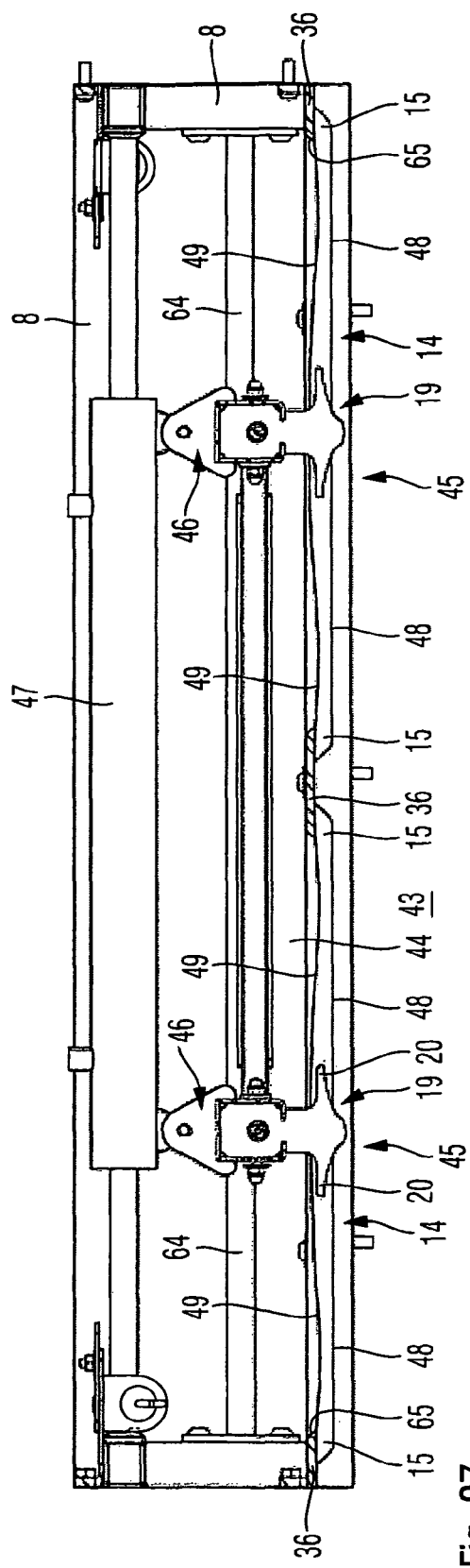
FIG. 27 shows a specific embodiment of a flat screening element, illustrated with the wiping devices in the center position.
Figure 28:
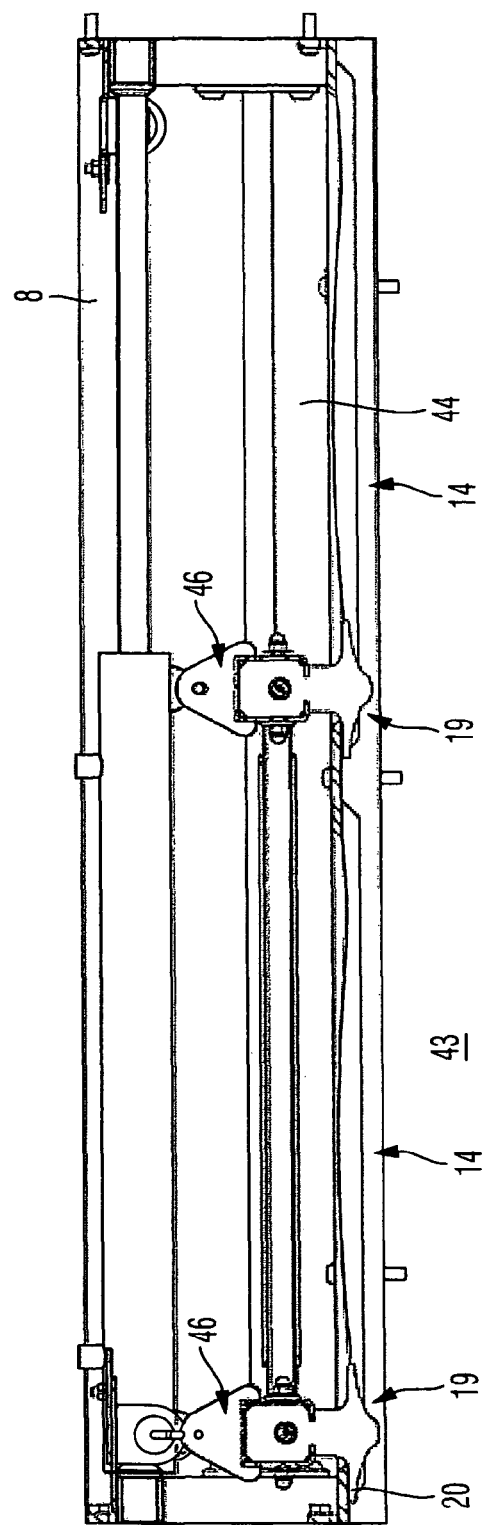
FIG. 28 shows the flat screening system according to FIG. 27, illustrated from the left end position of the wiping device adjacent to the carrier plates of the screening device.

In the embodiment according to FIG. 26, the wiping element 19 corresponds to that according to the embodiment in FIGS. 19 and 20. However, brushes 62, which are mounted in holders 63, are arranged in front of and behind the wiping element 19 in the directions of movement of said wiping element 19, with the holders 63 being connected to the receptacle 54. The brushes 62 have the function of brushing to the left or right any possible deposits or stones which have remained on the top of the screening rods 14. The brushes 62 project slightly from above into the gap formed between adjacent screening rods 14. Of course, the brushes 62 can also be used in a flat screening system, as can also the modifications of the wiping element 19 described above. The brushes 62 generally clean the upper side of the screening system. The carrier, either the lever 18 in the case of a round screening system, or the carriage 46 in the case of a flat screening system, which moves the wiping elements 19 to and fro, also accommodates the brushes 62.

FIGS. 27 to 32 illustrate a structural configuration of a flat screening system corresponding to the principal shown in FIGS. 4 to 11. Parts which correspond to this basic embodiment in terms of their design or their method of functioning are denoted by the same reference numbers for the sake of simplicity. Reference is made in this respect to the description above. Modifications in terms of the embodiment of the wiping elements 19 for the screenings can also be made to this flat screening system. Reference is made in this respect to the embodiments above, in particular according to FIGS. 15 to 25, and the brush variant according to FIG. 26.

In the embodiment according to FIGS. 27 to 32, the screening rods 14 are constructed according to the embodiment in FIG. 4, with the clean water faces 49 being curved upwards to a lesser degree. The drive 47 is embodied as a double-sided, fluid-activated cylinder, wherein the fluid pressure is generated by means of movement of the waterwheel 22 or the like. The carriages 46 are connected to the cylinder 47 and they slide on horizontally arranged rails 64 which are arranged parallel to one another and horizontally.

Figure 29:
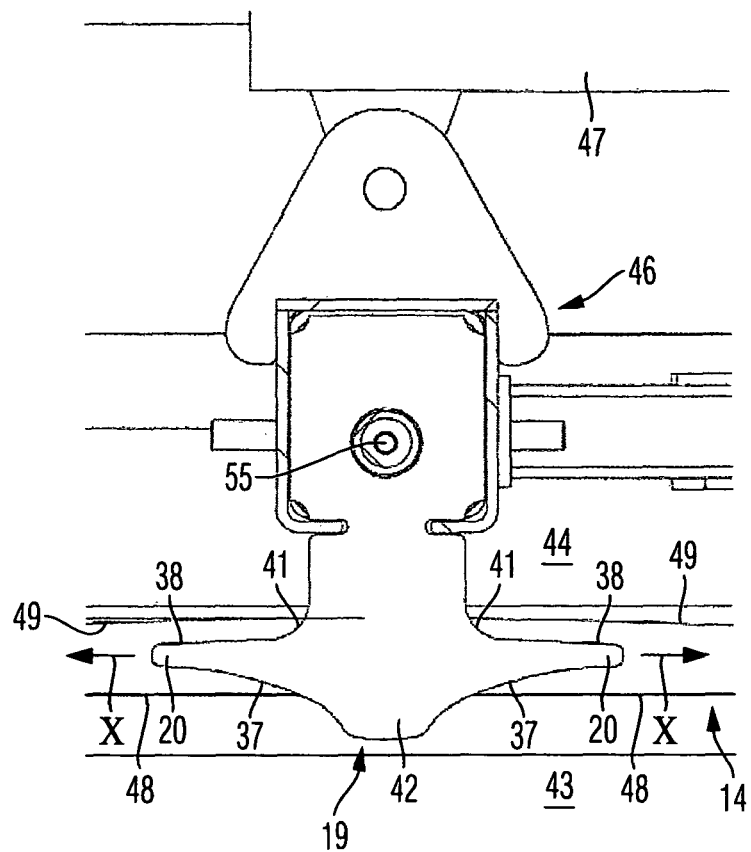
FIG. 29 shows the arrangement of the wiping element, its support and its arrangement with respect to the screening rods for the center position of the wiping device according to FIG. 27.
Figure 30:
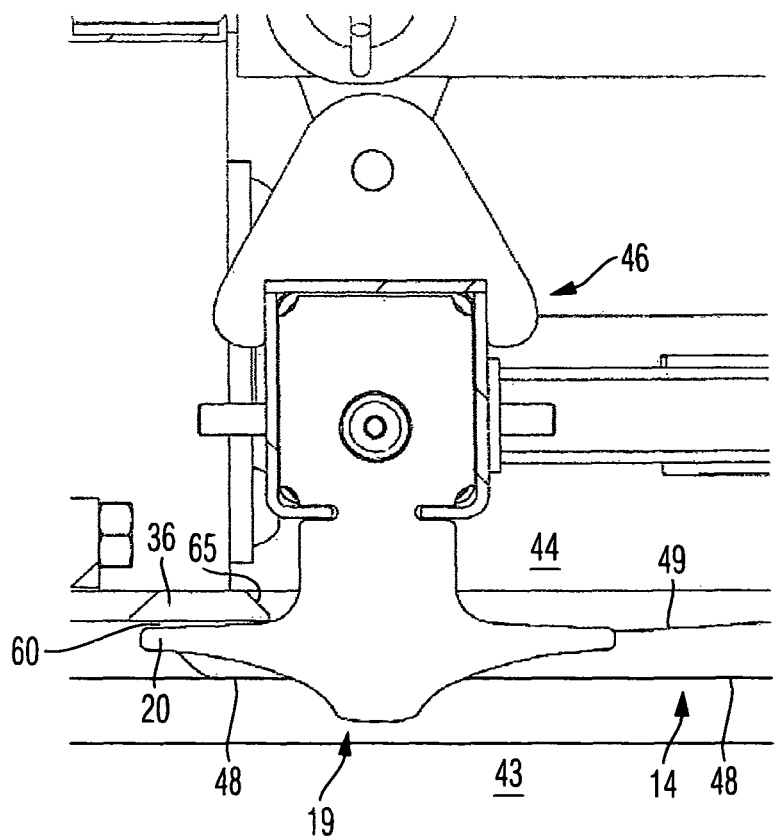
FIG. 30 shows an arrangement according to FIG. 29 for the end position of the wiping device shown in FIG. 28.

In this embodiment (FIGS. 27-32), the wiper faces 38 of the respective end projections 20 of the wiping element 19 are inclined slightly with respect to the horizontal, specifically inclined downward toward the free end, with the result being that, in the end position of the wiping element 19, gaps 60 are formed between the end projections 20 and the cross member 36, as shown in FIG. 30. The respective screening rods 14 are, as is clarified with respect to the basic embodiment of the flat screening system, made to become flatter or vertically thinner toward their ends 15. The level at which there is a flow through the gap 60 between adjacent screening rods 14 is lower in the embodiment according to FIGS. 27 to 30 than in the embodiment according to FIG. 4 with respect to the axes of symmetry of the screening rods 14.

In FIG. 29, the wiping element 19 is positioned in its center position, that is to say in its position in which it is symmetrical with respect to the axis of symmetry, in such a way that the end projections 20 of the wiping element 19 are arranged approximately at half the height or thickness of the screening rod 14. The downstream projection 42, which adjoins the inwardly curved end faces 37, is arranged with its lower end region significantly below the wastewater faces 48 of the adjacent screening rods 14. The direction of movement of the wiping elements 19 is generally horizontal, and therefore parallel to the arrangement of the wastewater faces 48 of the screening rods 14.

Figure 31:
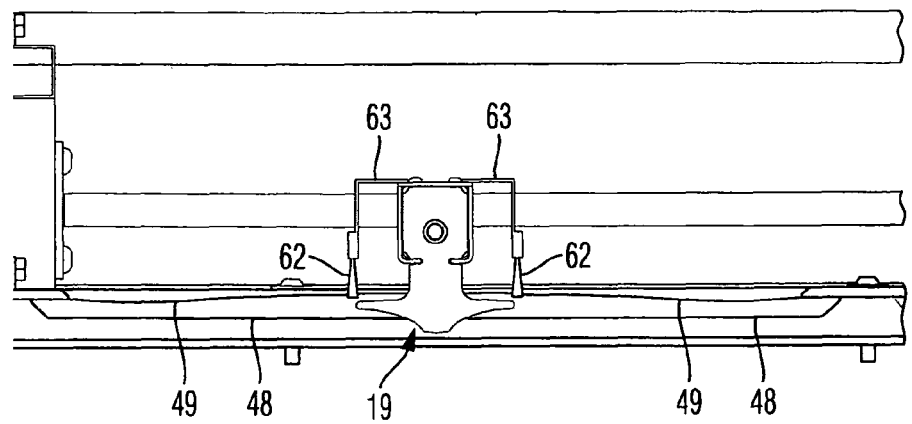
FIG. 31 shows the brushes used for cleaning the gaps in the arrangement according to FIG. 27.
Figure 32:
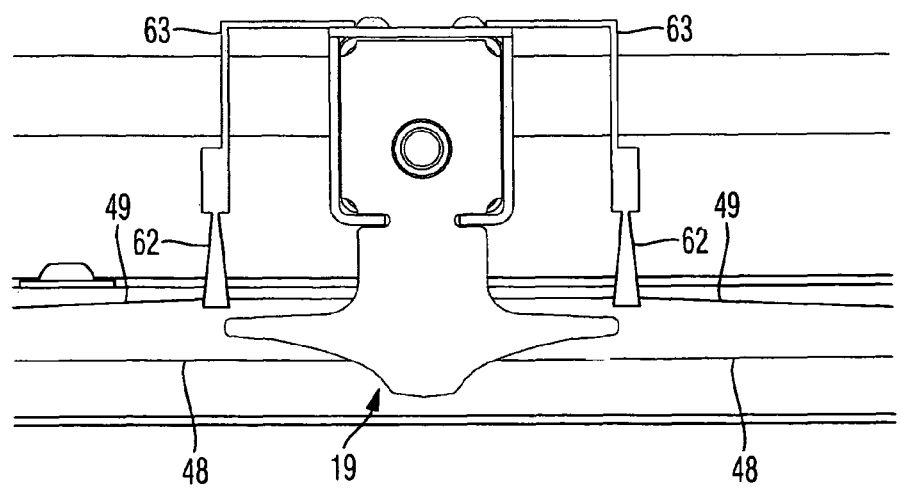
FIG. 32 shows the arrangement according to FIG. 31, in an enlarged illustration in the region of the brushes.

FIGS. 31 and 32 show the additional equipment for the embodiment which is shown in FIGS. 27 to 30, with brushes 62 arranged in front of and behind the respective wiping elements 19 and mounted in holders 63, with the holders 63 being connected to the receptacle 54. Reference is made in this respect to the embodiment in FIG. 26. The screening device 9 which is illustrated in the various embodiments described herein is particularly suitable for use in the treatment of wastewater and rainwater in retaining at overflows solids which are carried along in the wastewater. The screenings are wiped off over a relatively short distance in a gentle fashion through the interaction of the specially shaped screening rods 14 and the wiping elements 19 which are positioned between adjacent screening rods. Calm zones, which may be embodied as the flat, broad cross members 36, take up the water pressure and connect or discharge into a grill frame structure arranged in the screening device, which may have a modular design. The cross members 36 are provided, in particular, with chamfers 65. Because of the chamfering, solid bodies, such as stones, which are resting on the clean water sides 44 of the screening rods 14, can easily be pushed onto the calm zones, in particular adjacent the cross members 36, thereby preventing failure of the screening device because of blockage. The calm zone is a detachment zone. Since there is relatively little or no water pressure and/or flow in the calm zone, relatively large accumulations of screenings can drop downward under gravitational forces, and be transported away with the wastewater. The screening rods 14 are shaped in such a way that they require little material to manufacture. The cross members are, for example, positioned every 65 cm, as a result of which calm zones are formed between the adjacent rod screening modules both on the wastewater side and on the clean water side. The wiping arrangement is formed from individual wiping plates or wiping segments, which are fastened by keys, screws or otherwise fastened to a mount, so that the individual wiping elements (wiping segments/wiping plates) can be easily replaced. The wiping elements 19 are embodied in such a way that, owing to the tapered end projections of the wiping elements, each wiping element automatically causes the water constituents which pass between the screening rods to move to the wastewater side 43, that is to say, downwardly. The upper part of each wiping element 19 lifts rocks, stones and other debris lying on the clean water side of the screening system away from the gaps between the screening rods, and the residue or debris is intermediately deposited on the cross members. The reduction in the flow pressure with wiping elements 19 is evident for gentle transportation of the screenings, and above all, raises the water quality, since in particular toilet paper is not comminuted.

Owing to the cross members 36, it is not necessary for the contaminants to be transported over the entire length of the screening device. Instead, the screenings are only pushed to the ends of the respective set or module of screening rods. The wiping elements 19 are led on the clean water side 44, as a result of which, the screening device is overall particularly resistant to faults or failure. The wiping elements 19 are preferably composed of plastic, in particular of polyethylene.

The screening device operates continuously during the process of removing contaminants, and is configured for continuous operation.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A screening device for wastewater overflow weirs, and the like, comprising:
   a perforate screening member through which wastewater flows from a wastewater side thereof to a clean water side thereof, having a plurality of screening rods arranged in a laterally spaced apart, mutually parallel relationship, and a plurality of cross members supporting said screening rods thereon, such that solids in the wastewater flowing through said screening member from a downstream direction to an upstream direction are captured by said screening member and form screenings on said screening rods; and
   a wiper member having a plurality of wiping elements disposed between said screening rods, and being shifted longitudinally in a clearing direction along said screening rods for clearing the screenings from said screening member; each of said wiping elements having at least one end projection extending longitudinally outwardly in said clearing direction of said wiping elements and disposed laterally between said wastewater side of said screening member and said clear water side of said screening member, a wastewater wiping surface that tapers in said upstream direction to said end projection to clear screenings on said wastewater side of said screening member from said screening rods, and a clean water wiping surface that curves in said downstream direction to said end projection to clear debris on said clean water side of said screening member from said screening rods.

2. A screening device as set forth in claim 1, wherein:
   said wastewater wiping surface is shaped such that shifting of the same in said clearing direction clears screenings from said screening rods in a generally sideways and downstream direction; and
   said clean water wiping surface is shaped such that shifting of the same in said clearing direction clears debris from said screening rods in a generally sideways and upstream direction.

3. A screening device as set forth in claim 1, wherein:
   said screening member is oriented such that said wastewater side is disposed on a bottom side thereof, and said clean water side is disposed on a top side thereof.

4. A screening device as set forth in claim 1, wherein:
   said wiping elements are reciprocated longitudinally in opposite directions along said screening rods; and
   said wiping elements each have opposite ends with said end projection thereon which clear screenings from said screening rods when said wiping elements are shifted in opposite directions therealong.

5. A screening device as set forth in claim 4, wherein:
   said cross members include deposition surfaces oriented toward said wastewater side of said screening member; and
   said wiping elements are configured such that in opposite end positions along said screening rods said end projections engage behind said cross members at locations adjacent to said deposition surfaces.

6. A screening device as set forth in claim 5, wherein:
   said wiping elements and said deposition surfaces are configured such that when said wiping elements are in said end positions, gaps are formed between said end projections and said deposition surfaces, which open outwardly in said clearing direction.

7. A screening device as set forth in claim 5, wherein:
said wiping elements are configured such that in said end positions, the same make line contact with said cross members.

8. A screening device as set forth in claim 1, wherein:
said wiping elements have a plate-shaped configuration.

9. A screening device as set forth in claim 1, wherein:
said wiping elements are mounted in an adjustable receptacle which permits selectively adjusting the position of said wiping elements toward and away from said wastewater side and said clean water side of said screening member.

10. A screening device as set forth in claim 9, wherein:
said wiping elements each include alignment holes through which securing rods are inserted for attachment in said receptacle.

11. A screening device as set forth in claim 1, wherein:
said screening member comprises either a flat screen or a curved screen.

12. A screening device as set forth in claim 1, wherein:
said screening rods have a side elevational configuration which tapers inwardly from a center portion thereof to opposite end portions thereof.

13. A screening device as set forth in claim 1, wherein:
said screening rods have an arcuate side elevational configuration with a greater degree of curvature on said wastewater side of said screening member than on said clean water side of said screening member.

14. A screening device as set forth in claim 1, wherein:
said screening member has a curved central portion extending between opposite ends of said screening rods.

15. A screening device as set forth in claim 1, wherein:
said screening rods have an arcuate shape with a predetermined radius; and
said wiping elements are configured to move along a circular path having a radius which corresponds to the radius of said screening rods on one of the opposite sides thereof.

16. A screening device as set forth in claim 1, including:
a waterwheel drive operably connected with said wiper member to shift said wiping elements without external energy.

17. A screening device for wastewater overflow weirs, and the like, comprising:
a perforate screening member through which wastewater flows from a wastewater side thereof to a clean water side thereof, having a plurality of screening rods arranged in a laterally spaced apart, mutually parallel relationship, and a plurality of cross members supporting said screening rods thereon, such that solids in the wastewater flowing through said screening member from a downstream direction to an upstream direction are captured by said screening member and form screenings on said screening rods;
a wiper member having a plurality of wiping elements disposed between said screening rods, and being shifted longitudinally in a clearing direction along said screening rods for clearing the screenings from said screening member; said wiping elements each having at least one end projection extending longitudinally outwardly in said clearing direction of said wiping elements and disposed laterally between said wastewater side of said screening member and said clear water side of said screening member, a wastewater wiping surface that tapers in said upstream direction to said end projection to clear screenings from said screening rods; and wherein:
said end projection on said wiping elements includes a portion that is curved inwardly in said downstream direction.

18. A screening device as set forth in claim 17, wherein:
said wastewater wiping surface is shaped such that shifting of the same in said clearing direction clears screenings from said screening rods in a generally sideways and downstream direction.

19. A screening device as set forth in claim 17, wherein:
said wiping elements are mounted in an adjustable receptacle which permits selectively adjusting the position of said wiping elements toward and away from said wastewater side and said clean water side of said screening member.

20. A screening device as set forth in claim 17, wherein:
said screening member comprises either a flat screen or a curved screen.

21. A screening device as set forth in claim 17, wherein:
said screening rods have a side elevational configuration which tapers inwardly from a center portion thereof to opposite end portions thereof.

22. A screening device as set forth in claim 17, including:
a waterwheel drive operably connected with said wiper member to shift said wiping elements without external energy.

23. A screening device for wastewater overflow weirs, and the like, comprising:
a perforate screening member through which wastewater flows from a wastewater side thereof to a clean water side thereof, having a plurality of screening rods arranged in a laterally aced a art mutually parallel relationship, and a plurality of cross members supporting said screening rods thereon, such that solids in the wastewater flowing through said screening member from a downstream direction to an upstream direction are captured by said screening member and form screenings on said screening rods;
a wiper member having a plurality of wiping elements disposed between said screening rods, and being shifted longitudinally in a clearing direction along said screening rods for clearing the screenings from said screening member; said wiping elements each having at least one end projection extending longitudinally outwardly in said clearing direction of said wiping elements and disposed laterally between said wastewater side of said screening member and said clear water side of said screening member, a wastewater wiping surface that tapers in said upstream direction to said end projection to clear screenings from said screening rods; and wherein:
said wiping elements each have a portion adjoining said end projection which protrudes in said downstream direction and has a wiping surface which extends in a continuously curved fashion in a direction generally parallel to said clearing direction of said wiping elements.

24. A screening device as set forth in claim 23, wherein:
said wiping elements include downstream portions which project through said gaps formed between said screening rods on said wastewater side of said screening member.

25. A screening device as set forth in claim 23, wherein:
said wastewater wiping surface is shaped such that shifting of the same in said clearing direction clears screenings from said screening rods in a generally sideways and downstream direction.

26. A screening device as set forth in claim 23, wherein:
said wiping elements are mounted in an adjustable receptacle which permits selectively adjusting the position of said wiping elements toward and away from said wastewater side and said clean water side of said screening member.

27. A screening device as set forth in claim 23, wherein:
said screening member comprises either a flat screen or a curved screen.

28. A screening device as set forth in claim 23, wherein:
said screening rods have a side elevational configuration which tapers inwardly from a center portion thereof to opposite end portions thereof.

29. A screening device as set forth in claim 23, including:
a waterwheel drive operably connected with said wiper member to shift said wiping elements without external energy.

* * * * *